(12) United States Patent
Damikolas

(10) Patent No.: US 6,191,382 B1
(45) Date of Patent: Feb. 20, 2001

(54) DYNAMIC LASER CUTTING APPARATUS

(75) Inventor: Gerry Damikolas, Upland, CA (US)

(73) Assignee: Avery Dennison Corporation, Pasadena, CA (US)

(*) Notice: Under 35 U.S.C. 154(b), the term of this patent shall be extended for 0 days.

(21) Appl. No.: 09/054,286

(22) Filed: Apr. 2, 1998

(51) Int. Cl.$^7$ ..................................... B23K 26/00
(52) U.S. Cl. ................. 219/121.62; 219/121.67; 219/121.82; 219/121.84; 156/272.8
(58) Field of Search .......... 219/121.67, 121.72, 219/121.6, 121.62, 121.68, 121.69, 121.75, 121.76, 121.77, 121.8, 121.84, 121.86

(56) References Cited

U.S. PATENT DOCUMENTS

| | | |
|---|---|---|
| 3,582,466 | 6/1971 | Quirk . |
| 3,604,890 | 9/1971 | Mullaney et al. . |
| 3,653,384 | 4/1972 | Swope . |
| 3,769,488 | 10/1973 | Hasslinger . |
| 3,870,852 | 3/1975 | Kogert . |
| 3,965,327 | 6/1976 | Ehlscheid et al. . |
| 4,049,945 | 9/1977 | Ehlscheid et al. . |
| 4,297,559 | 10/1981 | Whitman, III . |
| 4,323,757 | 4/1982 | Oka et al. . |
| 4,330,208 | 5/1982 | Eloy . |

(List continued on next page.)

FOREIGN PATENT DOCUMENTS

| | | |
|---|---|---|
| 4133312 | 10/1991 | (DE) . |
| 0536683 | 10/1992 | (EP) . |
| 0536685 | 10/1992 | (EP) . |
| 221169155 | 10/1992 | (EP) . |
| 6108815 | 6/1996 | (EP) . |
| 5177666 | 12/1980 | (JP) . |
| 7217806 | 12/1982 | (JP) . |
| 7217807 | 12/1982 | (JP) . |
| 2112069 | 4/1990 | (JP) . |

OTHER PUBLICATIONS

News Release dated Aug. 21, 1995 Regarding Label Technologies, L.C.

Primary Examiner—Samuel M. Heinrich
(74) Attorney, Agent, or Firm—Oppenheimer Wolff Donnelly LLP

(57) ABSTRACT

This invention relates to a dynamic laser cutting apparatus for cutting successively various configurations on a moving feed stock or other moving web or successive sheets. The apparatus includes a control device, which monitors the relative location of the moving feed stock, and controls a scanner to direct a laser beam to cut successively various configurations on the desired relative location of the feed stock. One of the configurations that may be cut with the present invention is sets of successive sheets with index tabs in different locations, from a high-speed moving feed stock, thereby eliminating the need for collating the individual index tab sheets into a set. In order to cut consistently, the control device also monitors the speed of the moving feed stock, and based on the speed of the feed stock, adjusts the power level of the laser to cut consistently on the moving feed stock. Accordingly, even during startups and shut downs, when the feed stock is accelerating and decelerating, respectively, the present invention produces consistent cuts, thereby minimizing scrap. Additionally, the power level of the laser may be adjusted for various cutting operations, such as micro-perfing and scoring. The present invention may also be used to cut a multilayer feed stock, via scoring and micro-perfing, to produce variety of products, such as labels, business cards and the like. Furthermore, as the laser cuts along the edges of the feed stock, the edges are substantially beveled to minimize the "paper cuts", which may be caused by sharp edges. Also, an input and output ventilation system is provided to remove the vapors and/or dust that may be generated by the laser cutting on the feed stock.

62 Claims, 28 Drawing Sheets

U.S. PATENT DOCUMENTS

| | | |
|---|---|---|
| 4,346,284 | 8/1982 | Grollimund et al. . |
| 4,412,120 | 10/1983 | Duruz et al. . |
| 4,419,820 | 12/1983 | Stumpf . |
| 4,430,548 | 2/1984 | Macken . |
| 4,430,549 | 2/1984 | Macken . |
| 4,537,809 | 8/1985 | Ang et al. . |
| 4,549,063 | 10/1985 | Ang et al. . |
| 4,568,815 | 2/1986 | Kimbara et al. . |
| 4,618,758 | 10/1986 | Gilli et al. . |
| 4,626,999 | 12/1986 | Bannister . |
| 4,639,572 | 1/1987 | Gruzman et al. . |
| 4,645,900 | 2/1987 | Heyden . |
| 4,652,721 | 3/1987 | Miller et al. . |
| 4,659,900 | 4/1987 | Gilli et al. . |
| 4,659,902 * | 4/1987 | Swensrud et al. .............. 219/121.78 |
| 4,675,501 | 6/1987 | Klingel . |
| 4,740,668 | 4/1988 | Perez . |
| 4,762,514 | 8/1988 | Yoshida . |
| 4,837,088 | 6/1989 | Freedman . |
| 4,841,712 | 6/1989 | Roou . |
| 4,863,772 | 9/1989 | Cross . |
| 4,925,714 | 5/1990 | Freedman . |
| 5,001,325 | 3/1991 | Huizinga . |
| 5,087,498 | 2/1992 | Nedblake et al. . |
| 5,140,128 | 8/1992 | Jones et al. . |
| 5,198,275 | 3/1993 | Klein . |
| 5,200,592 | 4/1993 | Yabu . |
| 5,213,649 | 5/1993 | Sepavich et al. . |
| 5,225,649 | 7/1993 | Andreoli et al. . |
| 5,231,262 * | 7/1993 | Matsumura et al. ............ 219/121.67 |
| 5,262,215 | 11/1993 | Shields . |
| 5,262,612 | 11/1993 | Momany et al. . |
| 5,329,090 * | 7/1994 | Woelki et al. .................. 219/121.68 |
| 5,421,933 | 6/1995 | Nedblake et al. . |
| 5,444,212 | 8/1995 | MacNaughton . |
| 5,474,719 * | 12/1995 | Fan et al. ............................ 264/401 |
| 5,481,083 | 1/1996 | Smyth, Jr. . |
| 5,500,506 | 3/1996 | Lawson . |
| 5,520,760 | 5/1996 | Freedman . |
| 5,521,352 | 5/1996 | Lawson . |
| 5,585,017 | 12/1996 | James et al. . |
| 5,585,018 | 12/1996 | Kanaoka et al. . |
| 5,607,606 | 3/1997 | Mori et al. . |
| 5,611,949 | 3/1997 | Snellman et al. . |
| 5,624,520 | 4/1997 | Nedblake et al. . |
| 5,679,199 | 10/1997 | Nedblake et al. . |

* cited by examiner

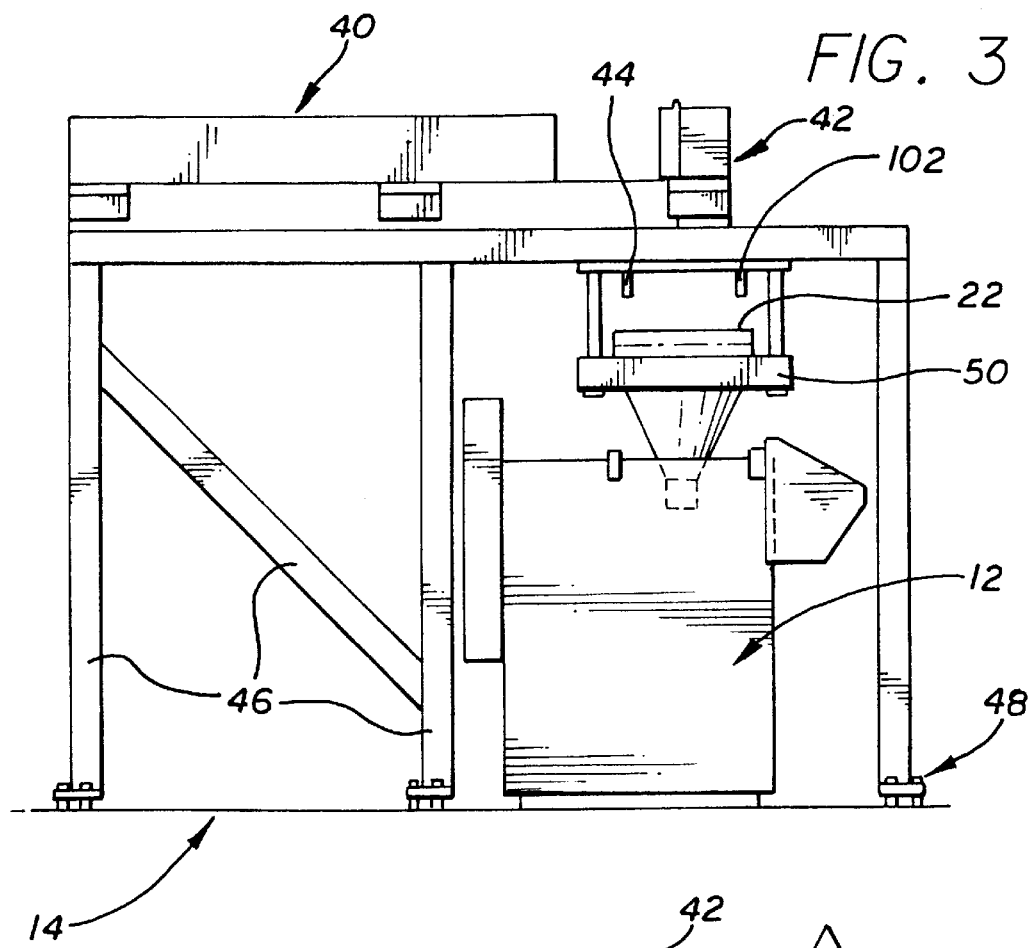
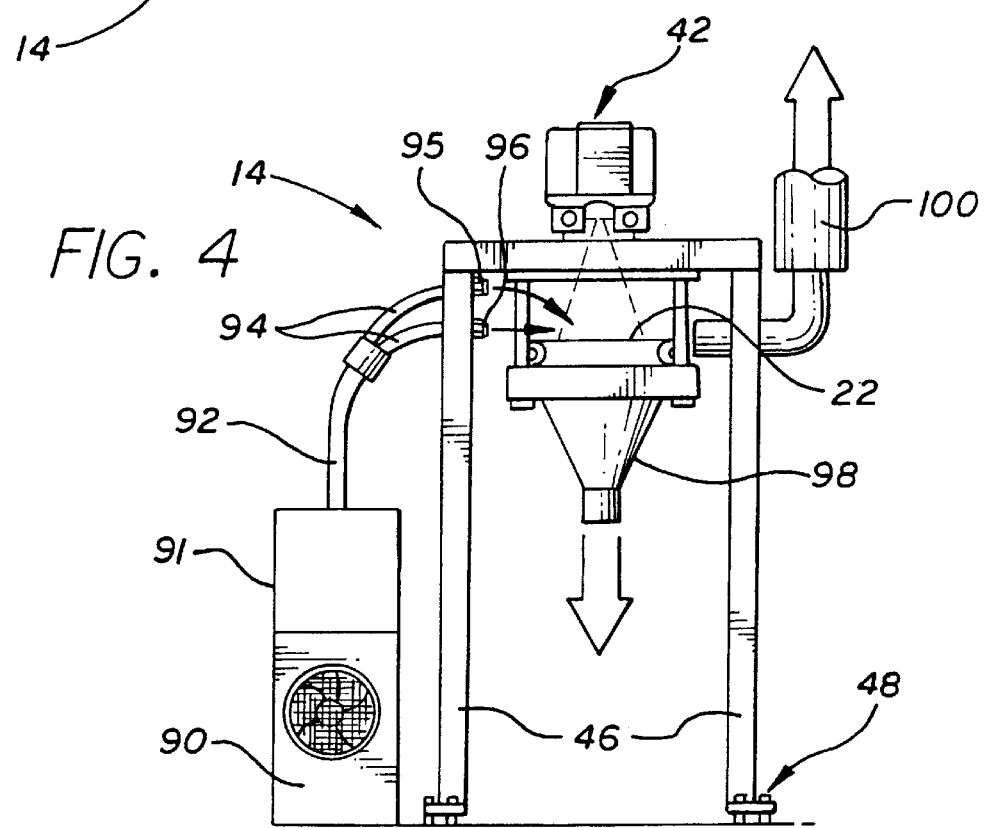

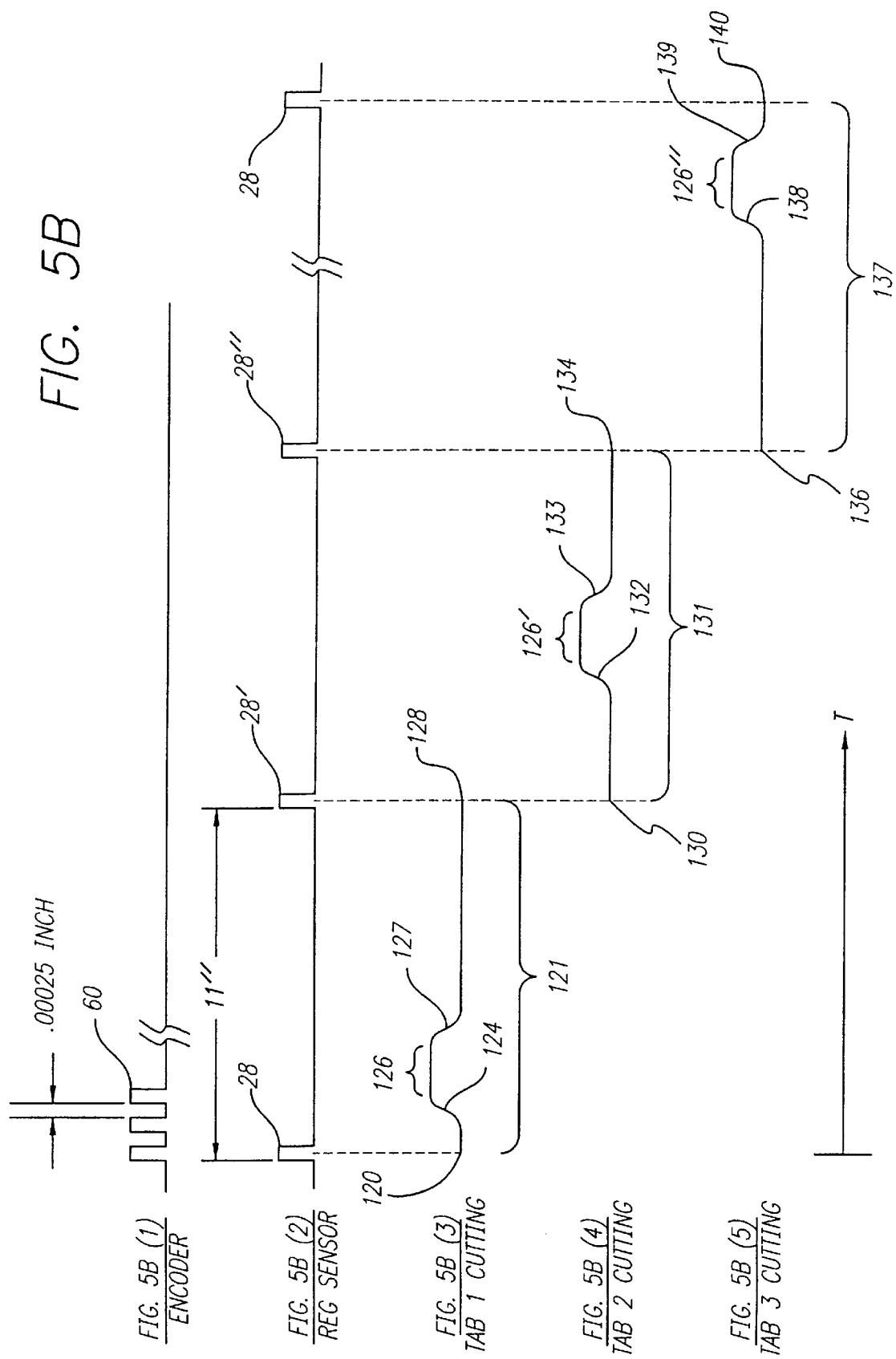

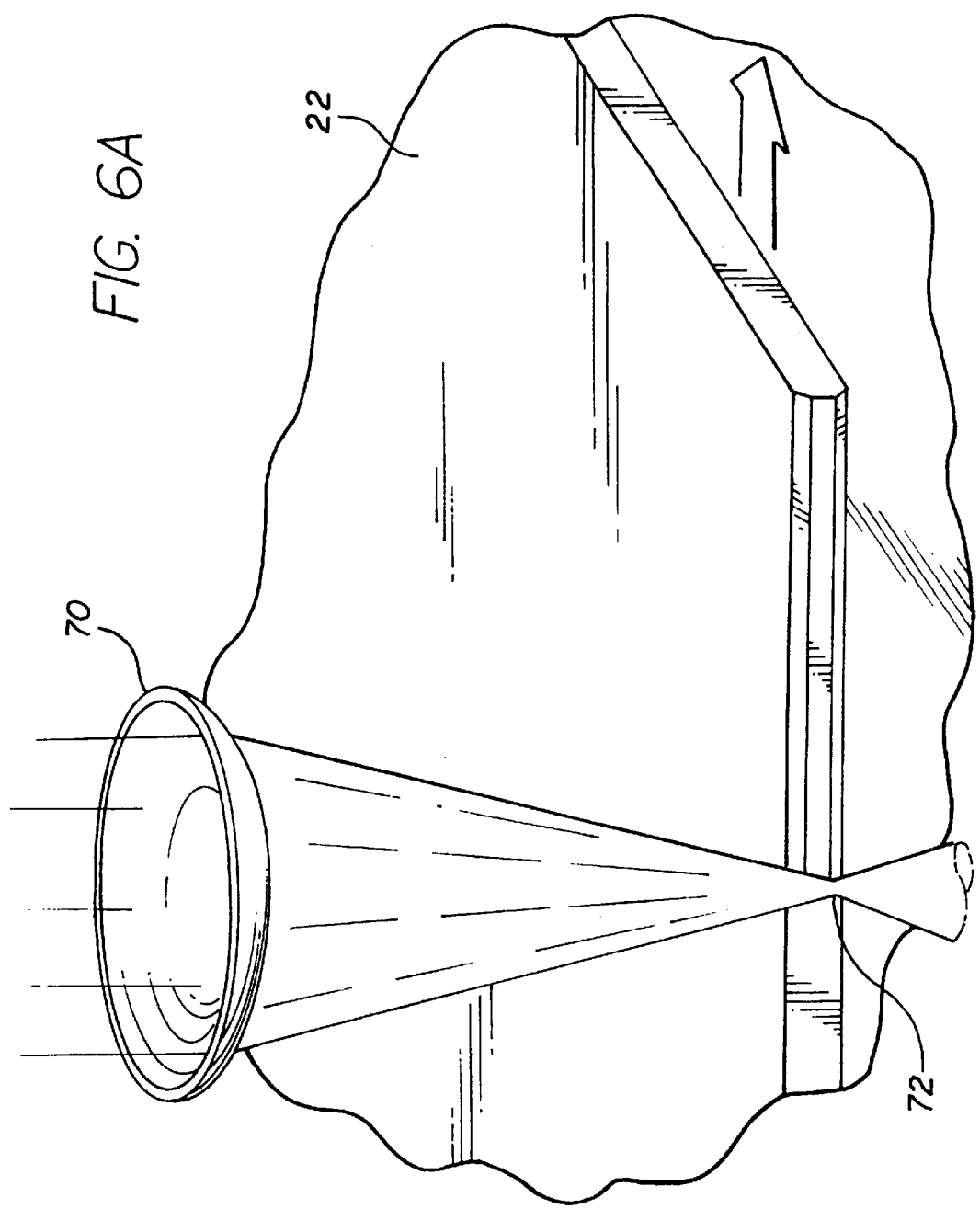

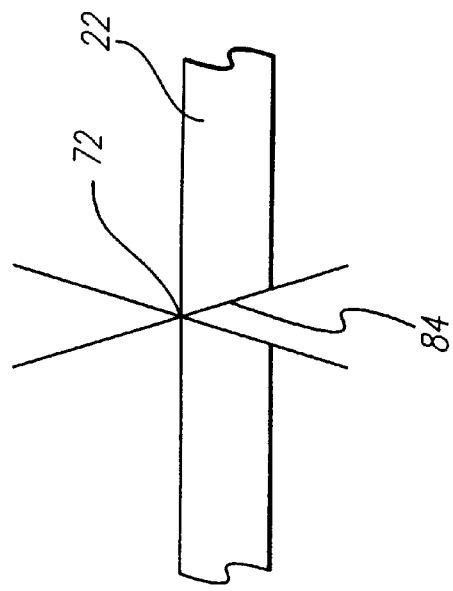
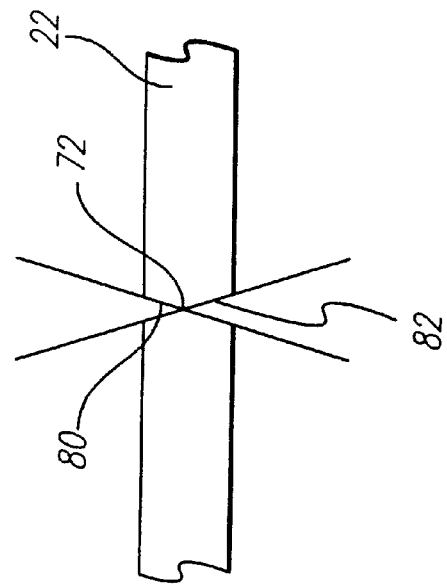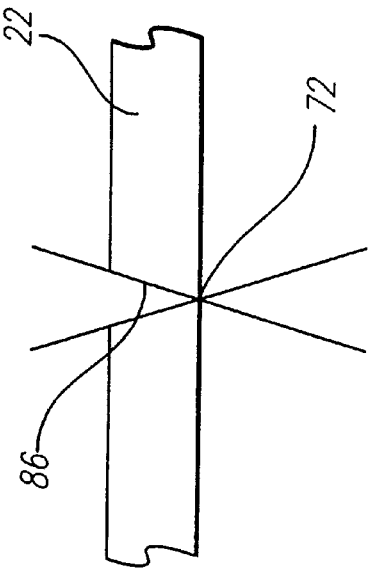

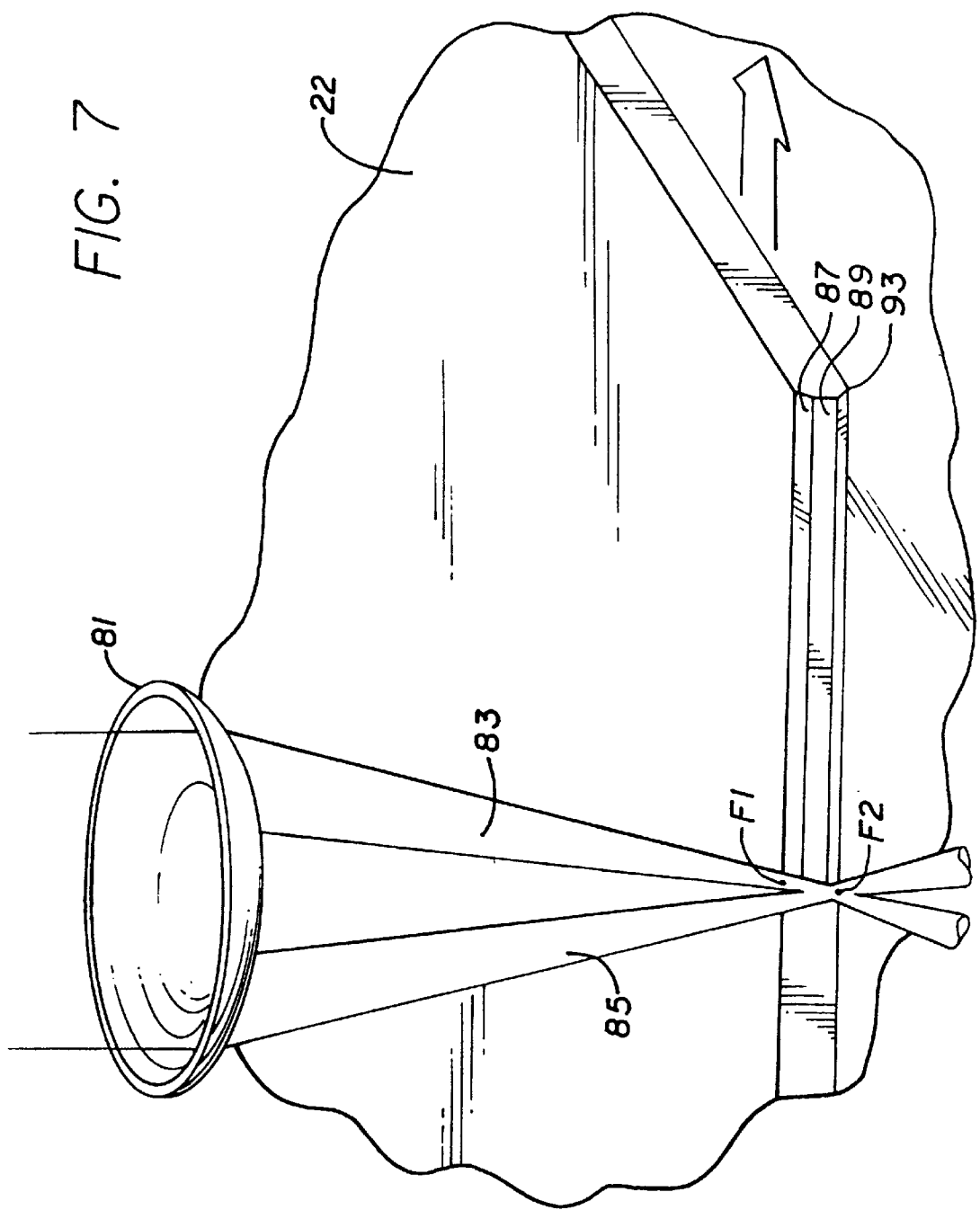

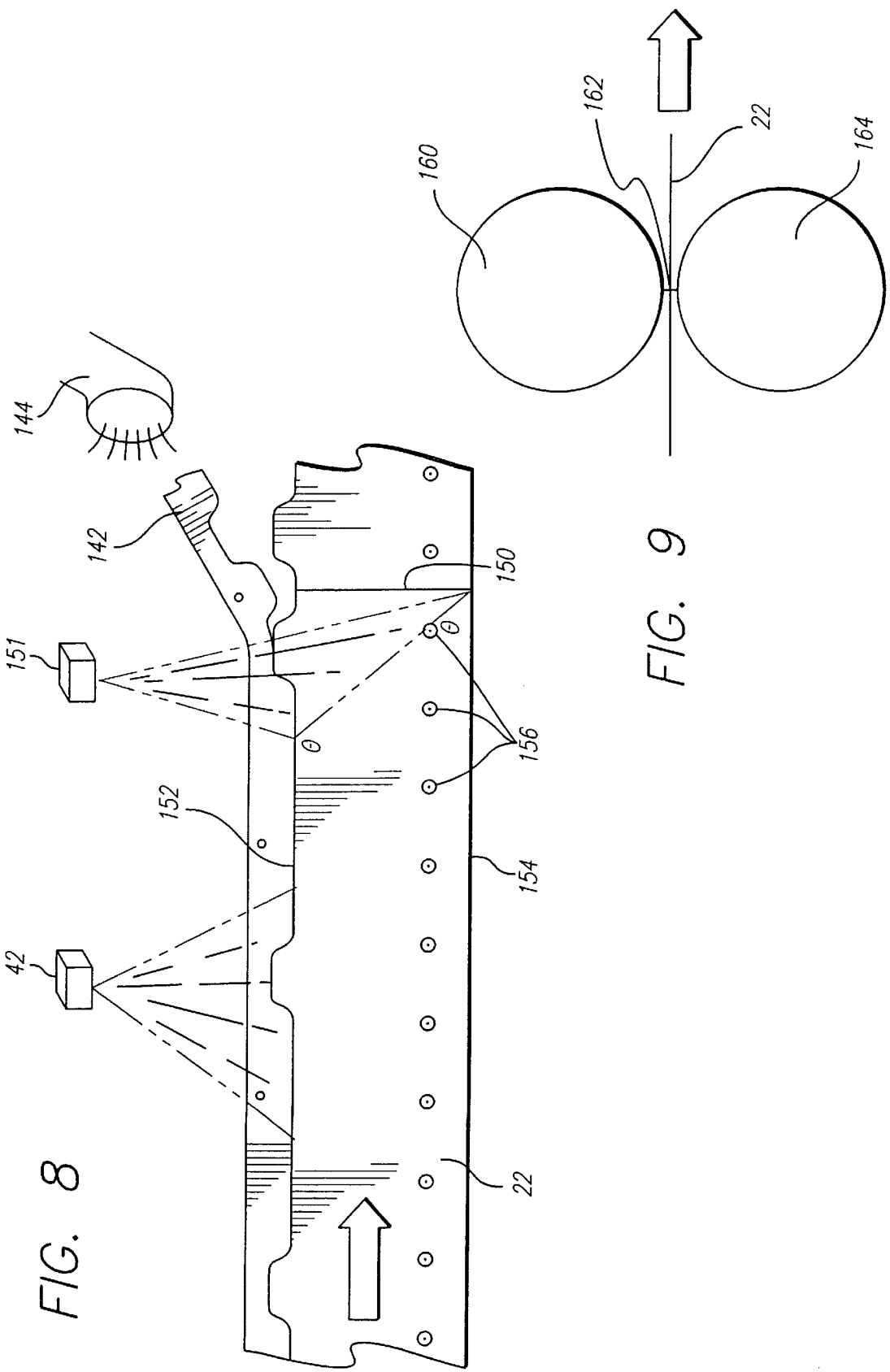

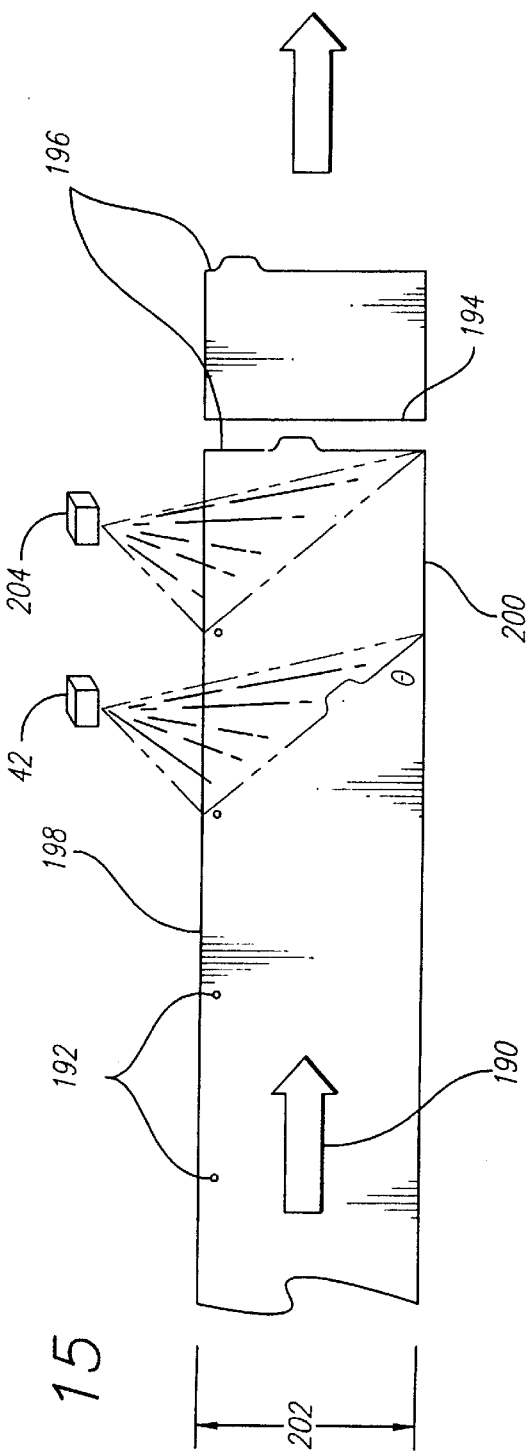
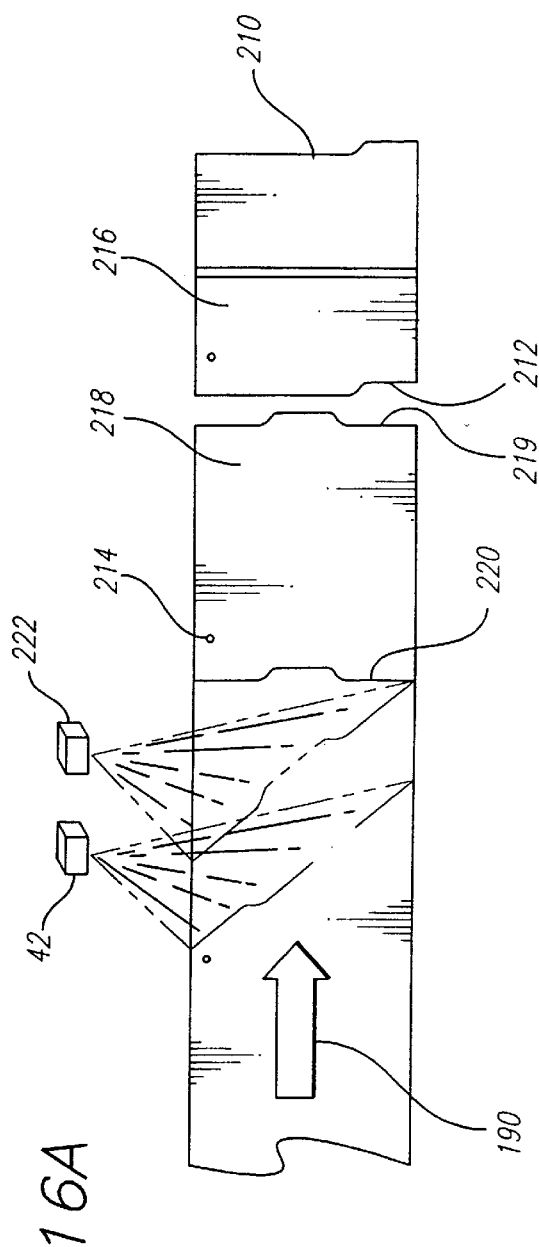
FIG. 15
FIG. 16A

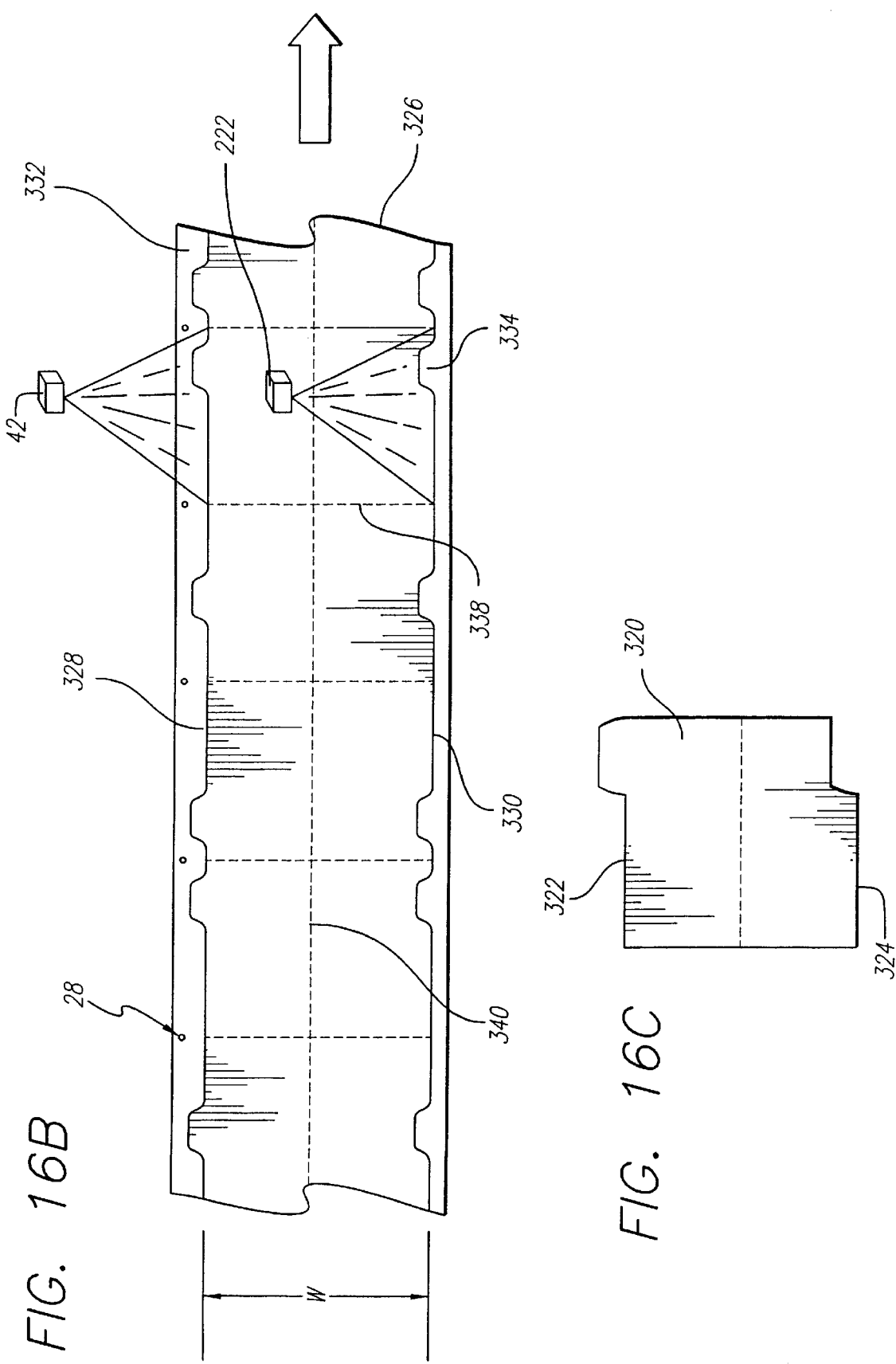

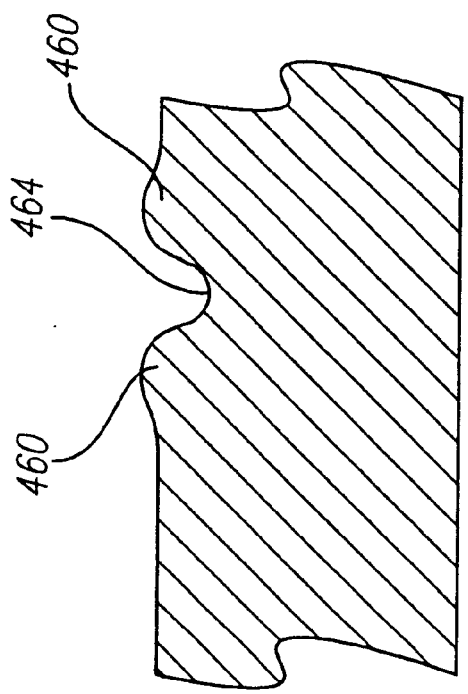
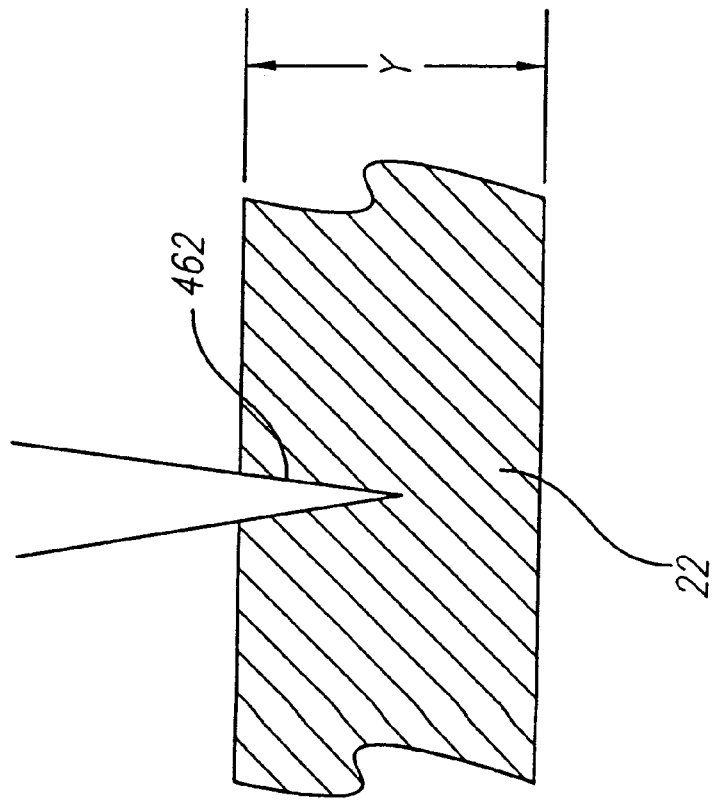
FIG. 22
FIG. 23

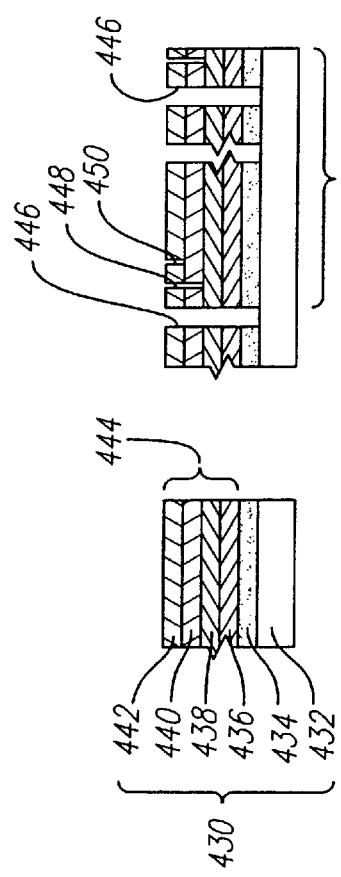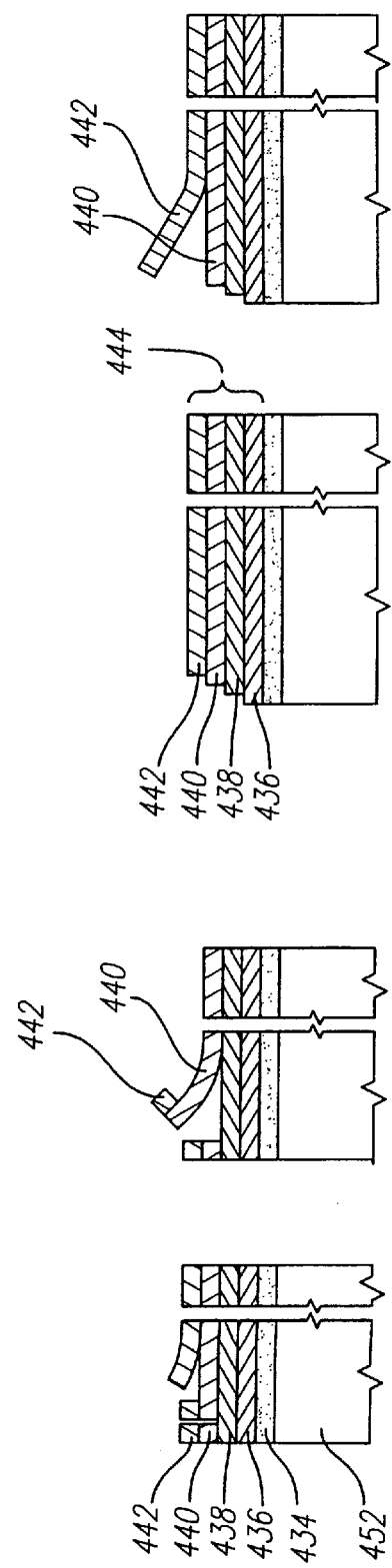

DYNAMIC LASER CUTTING APPARATUS

FIELD OF INVENTION

This invention relates generally to a dynamic apparatus for applying energy from a laser to cut or mark successive sheets or zones on sheet stock or web stock material.

BACKGROUND

Dies are widely used to cut variety of patterns on a workpiece, however, there are number of shortcomings with the use of a die. For example, individual dies must be custom made for a specific cut requirement, which can be very expensive. Also, after a period of cutting, dies must be retooled or replaced as they get worn-out. Consequently, during the life of a die, the quality of the cuts made by the die degenerates, thus producing inconsistent qualities of cuts over that period of time. Productivity may also be limited because under some circumstances, before a die can cut into a workpiece, the workpiece must be stopped.

Another consequence of die-cutting is a formation of dust surrounding the die-cutting area. This dust is formed because dies are designed to cut almost through the web, instead of all the way through, thereby leaving the bottom-most area uncut. Consequently, the bottom-most area because of its weakness breaks off, which ultimately separates that sheet from the web. However, when the bottom-most area breaks off, fiber residue is created forming the dust. One of the reasons for not having the die cut all the way through is to prevent the upper die from bearing against the hard surface of the lower mating die. Thus, formation of the dust is inherent with the die-cutting, which is problematic for the press and the operators nearby working on the press. Additionally, the lack of close tolerance of a die makes it difficult to cut partially through the workpiece, i.e. control the depth of the cut on the workpiece.

Another shortcoming with the die-cutting is the scrap or waste, which is produced during the initial start up and shut down. Rotary dies, for example, requires the press to run at a defined speed, in order to cut properly. The speed of the press, however, accelerates during the period of start up and decelerates during the period of shut down. Accordingly, during the periods of startup and shutdown, the quality of the die cuts are inconsistent and much scrap is produced.

Furthermore, since a die can only cut one particular configuration at a time, production process may be limited. For example, sets of index tab sheets are generally manufactured by employing a die-cutting mechanism, which cuts one particular tab location from a pile of sheets. Thereafter, dies are adjusted or changed so that another pile of sheets are cut with the next index tab location. This process is repeated until all of the index tab sheets forming a set have been cut. After all the stacks of individual index tab sheets forming a set have been cut, they have to be collated in the right tab order for packaging, i.e. individual tab sheets must be pulled from each stacks and organized sequentially into a set. This additional step is both time consuming and labor intensive, and at the same time, taking up valuable manufacturing floor space to store the stacks of index tab sheets.

Others have employed laser beams to cut on a moving web to alleviate some of the shortcomings of the die-cutting process. For example, U.S. Pat. No. 5,679,199 to Nedblake et al., describes an upper and lower laser beams, which are shiftable in the Y axis (vertical) in order to cut through a web to form patterns as the web moves past the laser beams.

U.S. Pat. No. 4,549,063 to Ang et al., describes a system that has a plurality of lasers cutting on a moving web. The disclosed system also controls the depth of the cuts by regulating the relative velocity of the beam and the web, the power output of the laser, and the diameter of the focused spot of the laser, or a combination of these.

U.S. Pat. No. 4,049,945 to Ehlscheid et al., describes a method and apparatus for cutting a predetermined pattern on a moving web wherein a laser beam is deflected by a series of pivotable mirrors. These mirrors are controlled so as to cause the laser beam to trace and cut a predetermined pattern. The laser beam moves only in rectilinear motion, as does the web of material to be cut. The direction of motions are not parallel, so that a desired pattern may be cut by controlling the relative speeds of the laser beam and the moving web of material.

The laser cutting systems, as described above, still have a number of shortcomings. For instances, using a laser, as described above, to cut the sets of index tab sheets would still require a separate collating process. Also, using laser beams to cut a moving web creates its own set of problems. These problems include the vapors which are formed when a laser beam is used to cut a moving web, creating mechanical problems for the apparatus and dangerous working condition for the operators. Also the inherent nature of the prior laser cutting system creates extremely sharp edges, which may cause "paper cuts" for the users, as they come into contact with the sharp edges. Furthermore, normal operation of the press in the prior systems creates disturbances on the moving web causing laser to cut inaccurately on the moving web. Additionally, none of the above patents disclose a method in which the controller keeps track of the exact horizontal and vertical location of the moving web so that the laser may be directed to cut on the precise location of the moving web.

For the foregoing reasons, there is a need for a dynamic laser cutting apparatus that may interface with commercial web press, for cutting a variety of configurations on the moving web with precision, without the aforementioned shortcomings.

SUMMARY OF THE INVENTION

Accordingly, a general object of this invention is to provide a dynamic laser cutting apparatus (hereinafter DLCA) for cutting a moving feed stock or successive sheet areas without the aforementioned problems. In particular, one object of the present invention is to provide a laser cutting apparatus that can interface with a commercial web press, to improve the productivity and quality of cutting a moving web. Viewed broadly, the present invention is a dynamic system that has various capabilities, such as (1) directing the laser along the precise location of the moving web to cut successively a plurality of configurations; (2) precisely controlling the power level of the laser to cut consistently depending on the speed of the moving web; (3) precisely controlling the power level of the laser depending on the speed of the moving web to control the depth of cutting; (4) precisely guiding the laser to cut along the desired location of the moving web; (5) pulsating the power level of the laser for a variety of partial cutting operations, such as a micro-perfing and scoring; (6) precisely controlling the focal point of the laser on the edges of the moving web to substantially bevel the edges; (7) providing instrument clean air near the cutting area to keep the cutting area free of vapors; (8) providing ventilation to remove the vapors; (9) cutting successive sheets with index tabs in different locations from a high-speed moving web, thereby eliminating the need for collating the individual index tab sheets, after they are cut by the DLCA; and (10) using multilayer webs to cut labels and the like.

In order to accomplish these and other objectives, DLCA viewed from the broad perspective preferably interfaces with a conventional web press for moving the web through the press at a high speed, with the sheets being printed if desired. The moving web may be periodically marked with registration marks, which indicate the beginning of the next sheet to be cut.

The DLCA preferably includes the following:

A frame configured to interface a dynamic laser cutting apparatus with a moving web.

A control device with a memory for controlling the laser cutting operation.

A laser device mounted on the frame for providing laser beams necessary to cut the moving web.

A scanner coupled to the frame and preferably adjacent to the laser device for directing the laser beam to cut one of the configurations stored in the memory along the moving web.

An encoder for monitoring the speed of the press, which is also indicative of the web speed.

A registration sensor may be coupled to the frame and preferably located over the moving web for detecting the registration marks on the moving web.

In brief, the control device communicates with the encoder and the registration sensor. The control device is then able to monitor the speed of the moving web and the registration marks. Based on the speed of the moving web and the registration marks, the control device continuously monitors the relative location of the moving web. For instance, the registration marks may be used as a reference point to recalibrate the exact location of the moving web every time it is detected; and based on the speed of the moving web, the control device can continuously monitor how far the web has moved past the last registration mark at any give time, thereby keeping track of the relative location of the moving web. Recalibration is done to minimize the inaccuracy in the cutting due to the disturbances that are present in the moving web.

The control device keeping track of the relative location of the moving web can control the scanner to cut any one of the configurations stored in the memory on the desired location of the moving web. This is done by inputting signals representing one of the configurations stored in the memory to the scanner, which then directs the laser to cut the configuration on the desired location of the moving web.

Alternatively, the feed stock may be successive sheets fed from a feeder; and the leading edges of the sheets may be used as the registration marks.

In considering the laser cutting action, the moving web is cut when it absorbs the energy of the laser, and the web at the point of contact by the laser is almost instantaneously vaporized, creating a clean, scorch-free cut. In order to cut consistently, the control device adjusts the power level of the laser, to deliver the precise amount of energy to the moving web needed for consistent cutting, based on the speed of the moving web. Accordingly, even during startup and shut down, when the web is accelerating and decelerating, respectively, the present invention produces consistent cuts, thereby minimizing scrap. Additionally, the power level of the laser may also be adjusted for various partial cutting operations, such as micro-perfing and scoring.

A multilayer web or multilayer sheets may also be used with the present invention. Again, the power level of the laser may be precisely controlled depending on the speed of the web to control the depth of cutting or to selectively cut a layer or layers on the web, or sheet stock, producing variety of products, such as labels, dry cards and the like.

These and other objects, features and advantages will become apparent from consideration of the following detailed description and from the accompanying drawings.

BRIEF DESCRIPTION OF THE DRAWINGS

FIG. 3 is a side view of an embodiment of the laser assembly taken in the direction of the moving web;

FIG. 4 is a front view of an embodiment of the laser assembly with an associated input and exhaust ventilation system;

FIG. 5B is a graphic representation of various stages of the preferred operation of the laser cutting apparatus;

FIG. 6A is a schematic perspective view of an embodiment of the laser system showing a lens focusing the laser beam on the moving web;

FIG. 6B is a side view of the edge of the moving web having the laser beam focused about the centerline of the moving web;

FIG. 6C is a side view of the edge of the moving web having the laser beam focused about the top surface of the moving web;

FIG. 6D is a side view of the edge of the moving web having the laser beam focused about the bottom surface of the moving web;

FIG. 7 is a schematic perspective view of a bifocal lens splitting the laser beam;

FIG. 8 is a schematic view of the moving web having three ring binder holes cut by a laser beam;

FIG. 9 is a schematic side view of an embodiment of a mechanical sheeter;

FIG. 15 is a top view of the moving web having sheets cut by a laser with the tabs being formed in the body of the web, rather than along the edges of the web;

FIG. 16A is a top view of the moving web having two edges of the manila file folders being cut by laser beams;

FIG. 16B is a top view of the moving web having two edges of the manila file folders being cut along the edges of the moving web;

FIG. 16C shows an exemplary manila file folder;

FIG. 22 is a cross-sectional view of a laser score cutting on a web;

FIG. 23 is a cross-sectional view of the web after it has been mechanically scored by a die;

FIG. 36A is a cross-sectional view of a multilayer laminate;

FIG. 36B is a cross-sectional view of a multilayer laminate after it has been cut by a laser;

FIG. 36C is a cross-sectional view of a multilayer laminate being applied to a substrate;

FIG. 36D is a cross-sectional view of a multilayer laminate having the top layer partially peeled off;

FIG. 36E is a cross-sectional view of a multilayer laminate having the second layer partially peeled off;

FIG. 36F is a cross-sectional view of a multilayer laminate with a series of descending steps of laser cuts;

FIG. 36G is a cross-sectional view of a multilayer laminate having the top layer partially peeled off;

FIG. 38 is a cross-sectional view of a multi-color laminate having a laser beam cut through different layers to reveal the color of the layer that is not cut through.

DETAILED DESCRIPTION OF THE PREFERRED EMBODIMENTS

Figure 1:
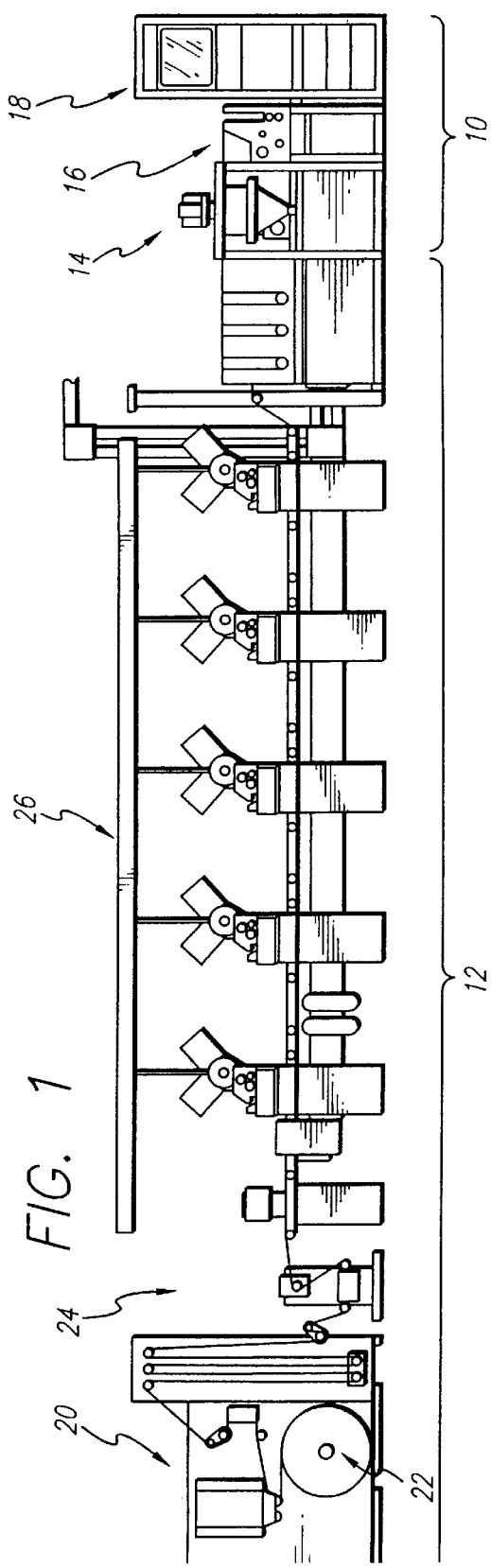
FIG. 1 is a broad view of a conventional press interfacing with an embodiment of the laser cutting apparatus.
Figure 2:
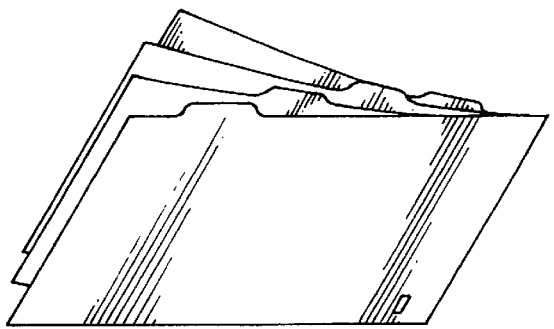
FIG. 2 is a perspective view of a set of index tab sheets with tabs in different locations.

The following is a detailed description of the best presently known mode of carrying out the invention. This description is not to be taken in a limiting sense, but is made merely for the purpose of illustrating the general principles of the invention. The scope of the invention is defined by the appended claims.

Viewed broadly, and as summarized above, the present invention is a dynamic system that has various capabilities, such as (1) directing the laser along the precise location of a moving web or other moving feed stock or successive sheets, to cut successively a plurality of configurations; (2) precisely controlling the power level of the laser to cut consistently depending on the speed of the moving feed stock; (3) precisely controlling the power level of the laser depending on the speed of the moving feed stock to control the depth of cutting; (4) precisely guiding the laser to cut along the desired location of the feed stock; (5) pulsating the power level of the laser for a variety of cutting operation, such as a micro-perfing and scoring; (6) precisely controlling the focal point of the laser on the edges of the feed stock to substantially bevel the edges; (7) providing instrument clean air near the cutting area to keep the cutting area free of vapors; (8) providing ventilation to remove the vapors; (9) cutting successive sheets with index tabs in different locations from successive sheet areas of a feed stock, thereby eliminating the need for collating the individual index tab sheets, after they are cut by the DLCA; and (10) using multilayer webs to cut labels and the like.

For instance, amount of laser power required to cut a moving feed stock depends on its speed, i.e. at low speed less laser power is required than at higher speed. Consequently, in order to produce a consistent quality of cuts, the power level of the laser must be adjusted depending on the speed of the moving feed stock. For example, during a start up, the feed stock is ramped up from an initial speed of zero to an operating speed, during this period of acceleration, the present invention monitors the speed of the moving feed stock and appropriately raises the power level of the laser so that the laser can cut consistently on the accelerating moving feed stock, thus avoiding scrap.

As illustrated for example in FIGS. 1–5, in accordance with one embodiment of the present invention, a dynamic laser cutting apparatus 10 (hereinafter DLCA 10) is set up to interface with a conventional web press 12 to cut sets of successive configurations. The conventional web press 12 may include a feeder 20, a roll of web 22, a web guide 24, and a series of printing stations 26. Accordingly, in this embodiment the moving feed stock is the moving web 22. Viewed broadly, the operation of the conventional press 12 begins by the web 22 being pulled through the feeder 20, then the web 22 is passed onto the web guide 24. Thereafter, the web guide 24 aligns the web 22 for feeding along the series of printing stations 26, where the desired printing is placed on the moving web 22. Once the printing is done, the moving web 22 is guided into the DLCA 10.

As shown by way of example in FIG. 1, according to this embodiment, the DLCA 10 preferably includes a laser cutting assembly 14, a sheeter assembly 16, and a control assembly 18. Viewed broadly, the operation may begin by the press 12 feeding the moving web 22 into the laser assembly 14, which operates under the direction of the control assembly 18. As the moving web 22 passes through the laser cutting assembly 14, the control assembly 18 directs the laser cutting assembly 14 to cut successively a plurality of configurations on successive sections on the moving web 22, such as sets of successive index tabs in different locations along the edges of sheets to be cut from the moving web 22. Thereafter, the sheeter assembly 16 cuts the individual sections of the moving web 22, separating them into individual sheets. As the individual sheets are cut they are passed to a collection bin for collection (not shown).

Figure 5A:
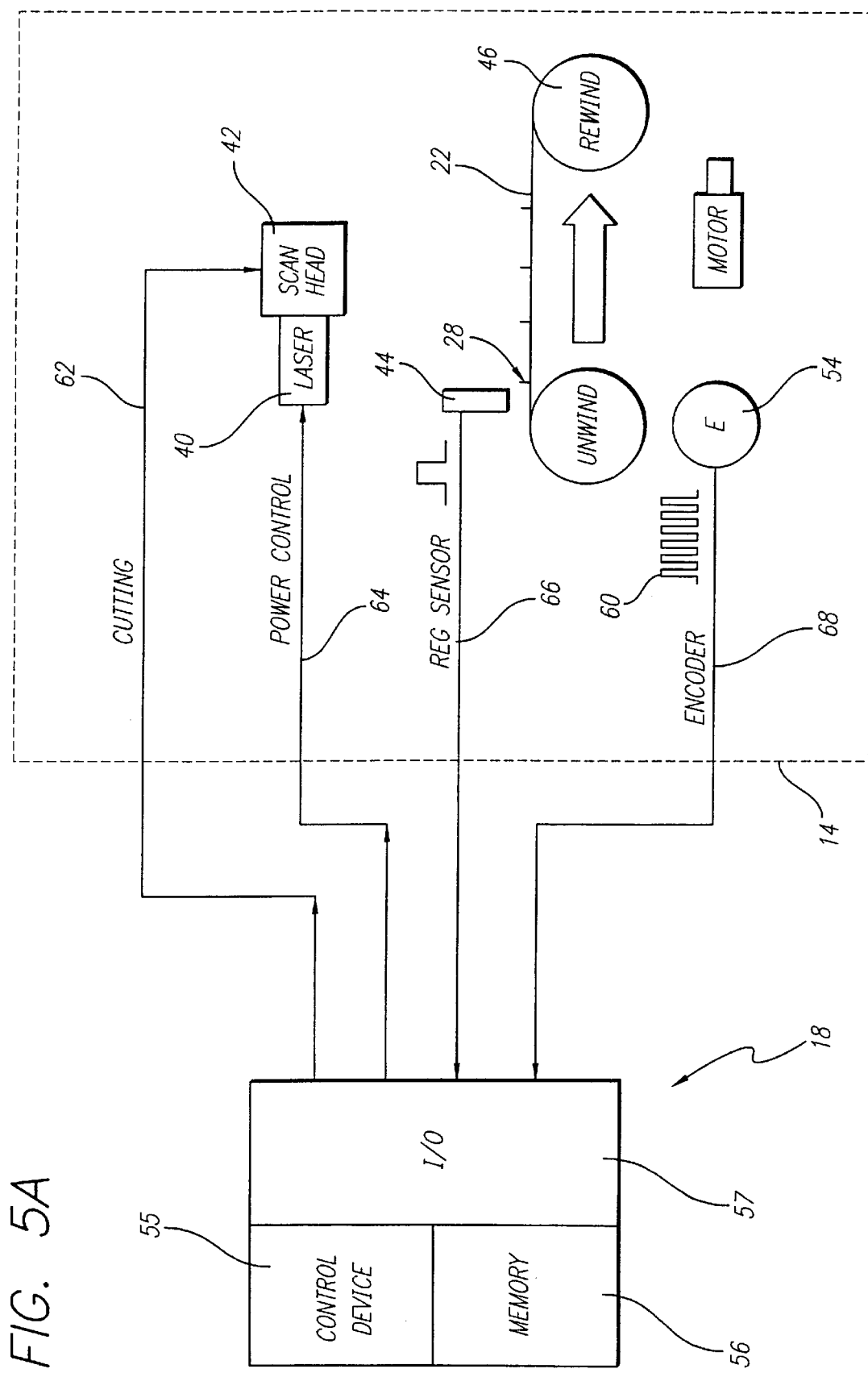
FIG. 5A is a diagrammatic representation of a preferred way of operating the laser cutting apparatus.

As shown by way of example in the diagrammatic representation of FIG. 5A, the laser cutting assembly 14 preferably includes a laser device 40 for providing a laser beam to a scanner 42, which directs the laser beam to cut successively a plurality of configurations on the moving web 22. Preferably, the scanner 42 is mounted over the moving web 22 and adjacent to the laser device 40. Additionally, a registration sensor 44 may also be placed over the moving web 22, to detect the registration marks 28 as the web is being pass through.

As shown by way of example in FIG. 3, in accordance with this embodiment, the laser assembly 14 also includes a frame 46 for interfacing the laser assembly 14 with the commercial web press 12. The frame 46 may be manufactured by Lemco Co. located at 1933 West 11th Street Unit L, Upland Calif., 91784. The frame 46 may be configured to interface the laser assembly 14 with a variety of commercial web presses such as the commercial web press 12, which is manufactured by COMCO Machinery Inc., 910 Lila Ave, Milford, Ohio. As illustrated by way of example in FIG. 3, the frame 46 is securely anchored to the floor by a plurality of anchor bolts 48. The frame 46 is also configured around the commercial web press 12 so that the frame 46 holds the scanner 42 over the moving web 22. Additionally, the laser device 40 is preferably coupled to the frame 46 and positioned adjacent to the scanner 42; and the registration sensor 44 is positioned over the moving web 22 in order to detect the registration marks 28. A web frame 50 is also coupled to the frame 46 to hold the moving web 22 as it moves through the laser cutting station.

As shown by way of example in FIG. 5A, the control assembly 18 in this embodiment includes a control device 55 for controlling the laser cutting operation, which is linked to an input/output slot 57 (hereinafter I/O slot 57) for receiving and transmitting signals. In this embodiment, the I/O slot 57 has a plurality of input slots for receiving a registration-sensor signal 66 from the registration sensor 44 and an encoder signal 68 from the encoder 54. The I/O slot 57 also has a plurality of output slots for transmitting a cutting signal 62 to the scanner 42 and a power control signal 64 to the laser device 40. Various features and functionality of the above devices will now be further explained.

According to this embodiment, the encoder 54 is used to monitor the speed of the moving web 22. For example, one of the ways to monitor the speed of the moving web 22 is to monitor the rotational speed of the press 12, which is indicative of the speed of the moving web 22. To measure the rotational speed, the encoder 54 is preferably coupled to the shaft of the press 12, and as the shaft rotates the encoder 54 detects series of pulsating signals 60 from the shaft (see FIG. 5B(1)) per unit of time, from which the speed of the press 12 may be determined. For example, as shown in FIG. 5B(1), the pulse width of the pulse 60 may be set at 0.00025 inch (0.000635 cm) or 44,000 pulses per every 11 inches (27.94 cm) of the moving web 22, and there may be 10,160 pulses per one revolution of the shaft of the press 12. Consequently, if the shaft is rotating at 40 rev/sec then the moving web 22 has a speed of 508 feet/min (154.83 meters/sec), or if the shaft is rotating at 24 rev/sec then the moving web 22 has a speed of 304 feet/min (91.44 meters/sec). There are number of other ways in which the speed of the moving web 22 could be measured, for example, the registration marks 28 being 11 inches (27.94 cm) apart may be used to measure the speed depending on number of the registration marks 28 that are detected per unit of time.

The control device 55, in this embodiment, is preferably programmed with various features to run the laser cutting operation efficiently and make necessary adjustments depending on the feedback from the sensors. For example, as a web moves across a press, one of the side effects are the disturbances, or momentary delays, which impede continuous flow of the web across the press. Consequently, as the laser is directed to cut on the moving web, these disturbances can cause inaccurate cuts to be made on the moving web. These disturbances are caused by the press operating on the moving web. For instance, any time the printing station 26 prints on the moving web 22, there is a disturbance because the contact between the printing station 26 and the moving web 22 delays and disturbs the continuous flow of the moving web 22.

Another side effect of a moving web is that it may stretch, which results from the tension on the web. The tension may be caused during the acceleration of the web or near the area of the disturbances, for example. As a result, any stretching by the web in the area where the laser is cutting can also result in inaccurate dimensional cuts.

To resolve the aforementioned problems, the control device 55 is preferably programmed to compensate for the disturbances and stretching by keeping track of the relative position of the moving web 22 in reference to a registration mark 28, so that the laser cutting may be correctly timed. To keep track of the relative position, the control device 55 preferably uses every registration mark 28 as a reference point; thereafter, the control device 55 monitors the number of pulses that have passed after the latest registration mark 28 to keep track of the relative position of the moving web 22, i.e. monitor the speed of the moving web. For example, if the control device 55 has detected 22,000 pulses from the latest registration mark 28 then at that point in time the moving web 22 has passed 5½ inches (13.97 cm) from the latest registration mark 28. Thus, the control device 55 continuously monitors the relative location of the moving web 22, and accordingly, outputs the signals to the scanner 42 to direct the laser to make accurate cuts on the moving web 22. The control device 55 then resets on the occurrence of every registration mark 28 to establish a new reference point from the latest registration mark 28 so that any disturbances or stretching that was done prior to this cutting does not have a cumulative effect to distort current cutting accuracy.

Another feature of this embodiment is to consistently produce high quality of cuts on the web 22, even at varying speeds, by adjusting the power level of the laser device 40 depending on the speed of the moving web 22. Adjusting the power level of the laser produces consistent cuts because a faster moving web requires more laser power to cut than a slower moving web. More laser power is needed for a faster moving web because the web is cut by absorbing the energy of the laser at the point of contact, which causes the material to evaporate. Consequently, in order to cut consistently on the moving web, consistent amounts of energy need to be delivered to the web. Accordingly, as the web moves faster the power level of the laser needs to be raised to prevent incomplete cutting of the moving web. Conversely, as the web slows down, the power level of the laser needs to be lowered to maintain a uniform cut on the moving web.

As illustrated by way of example in FIG. 5A, to adjust the power level according to the speed of the web, the control device 55 monitors the encoder signal 68 to detect the speed of the moving web 22; then, depending on the speed, the control device 55 transmits the power control signal 64 to the laser device 40 to adjust the power level of the laser. Accordingly, during the initial start up, when the web 22 is accelerated from rest to operational speed, the control device 55 monitors the speed of the moving web 22 during this period, and appropriately raises the power level of the laser device 40. Conversely, during the shut down period, the control device 55 lowers the power level of the laser device 40 based on the speed of the moving web 22. One of the advantages with this feature is the reduction of scrap during the initial start up, and during shut down, thereby, improving productivity and saving time during the start up and shut down. Another advantage is the consistent high quality cuts that are made on the moving web even at varying speeds.

Alternatively, as illustrated by way of example in FIG. 22, the control device 55 may precisely control the power level of the laser to cut partially through the web, and thus score the web. To only cut partially through, the control device 55 controls the power level of the laser by delivering only enough laser energy for the upper area of the web 22 to absorb the energy and evaporate, thereby, cutting partially through and leaving the lower area of the web 22 uncut. One of the advantages of scoring with the laser is that the material that absorbs the energy is removed through evaporation, which leaves a clean cut recess 462. As illustrated in FIG. 22, the thickness "y" of a typical ninety pound paper web is approximately 0.0075 inch (0.01905 cm), and with the present invention the depth of the score cut may be controlled to few tenths of a thousandth of an inch. Incidentally, when the phrase ninety pound (40.5 kg) or thirty pound (13.5 kg) stock or paper is employed, reference is made to the weight of 500 sheets of paper 26 inches by 36 inches in size (66.04 by 91.44 cm).

However, as illustrated in FIG. 23, when dies are used for scoring, the material on the upper-most area of the web are pushed aside instead of being cut away, thereby, creating a bulge 460 on each side of a recess 464. When a user of the final commercial product tries to fold along the recess 464, the bulge 460 may impede folding along the recess 464, requiring additional effort by the user, and providing a product which is not aesthetically pleasing.

Another feature of this embodiment is to cut on demand any one of many configurations on the desired location of the moving web 22. In this regard, the control device 55 is preferably linked to a memory bank 56 where a plurality of configurations that are to be cut are stored in the memory bank 56. The control device 55 may then direct the scanner 42 to cut any one of the configurations stored in the memory bank 56 on the desired location of the moving web 22. To cut on the desired location of the moving web 22, the control device 55 monitors the location of the moving web 22 relative to the latest registration mark 28 as described above. Again, by using the registration mark 28 as the latest reference point, the present invention substantially minimizes the distortion that may result from cutting on the moving web 22 due to the disturbances and/or stretching by the moving web 22.

In order to cut different configurations on a moving web, the scanner 42 is used, which is a system similar to the HPLK scanner manufactured by General Scanning Inc., located 500 Arsenal Street, Massachusetts 02172. This system includes hardware and software for the laser marking or cutting of a stationary target. The software was subject to modification by the vector correction of the system with information relating to the speed of the web so that configurations may be cut on a moving web. For instance, once a particular configuration is selected to be cut on a desired location of the moving web 22, the control device converts that configuration into a series of X and Y vectors, which represents the configuration. As discussed above, the control device 55 monitoring the relative location of the moving web 22 can determine the relative X and Y coordinates of the moving web 22 at any given time. Accordingly, the control device 55 monitoring the relative X and Y coordinates of the moving web 22 controls the scanner 42 to cut the series of X and Y vectors representing the configuration, thus cutting the configuration on the desired location of the moving web 22.

The scanner 42 preferably includes an X axis mirror and an Y axis mirror (not shown), which respond to the X and Y vector signals from the control device 55, respectively. Accordingly, the X and Y axis mirrors respond to the X and Y vector signals to direct the laser beams to cut the configuration on the desired location of the moving web 22.

Figure 5C:
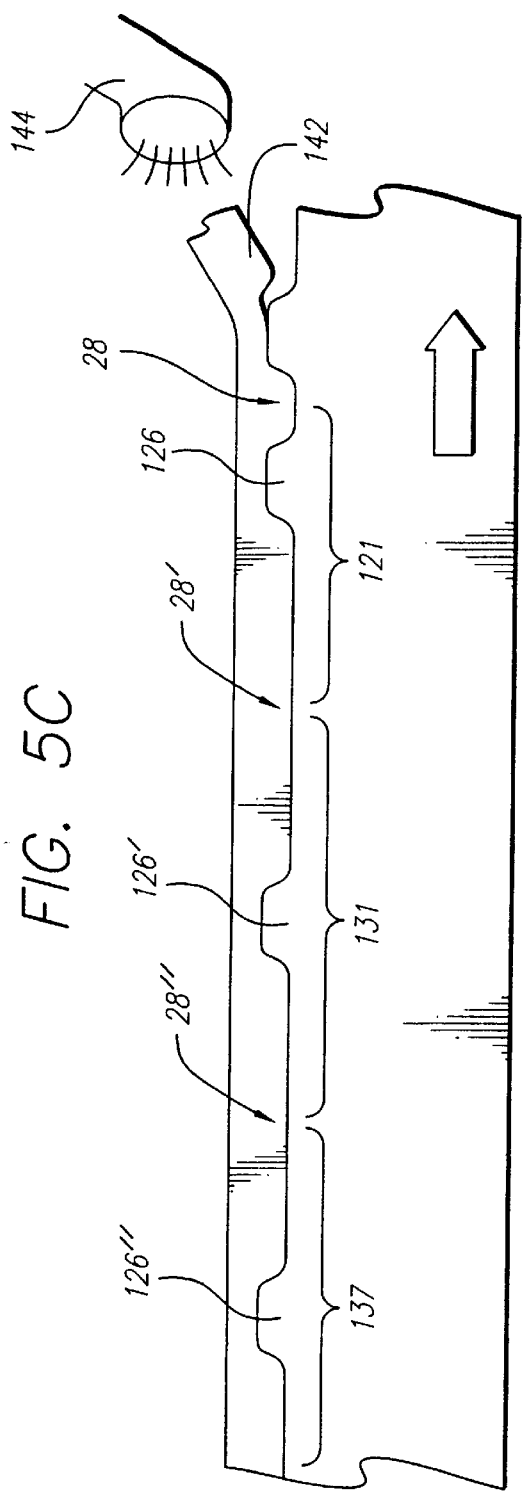
FIG. 5C is a schematic top view of the moving web having tabs cut by the laser.
Figure 5D:
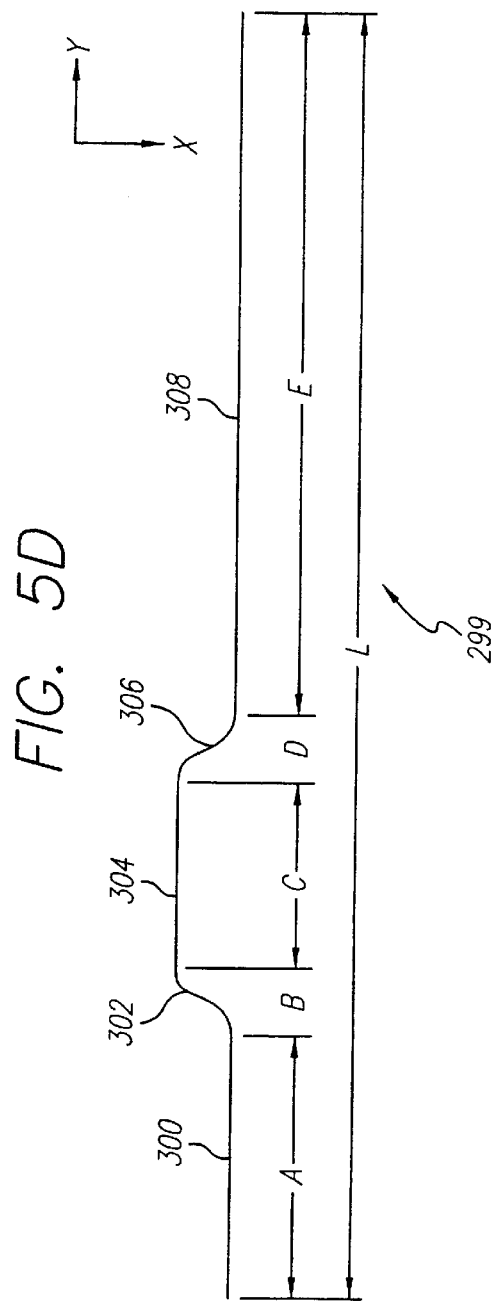
FIG. 5D is an exemplary index tab edge on one of a set of index tab sheets.
Figure 5E:
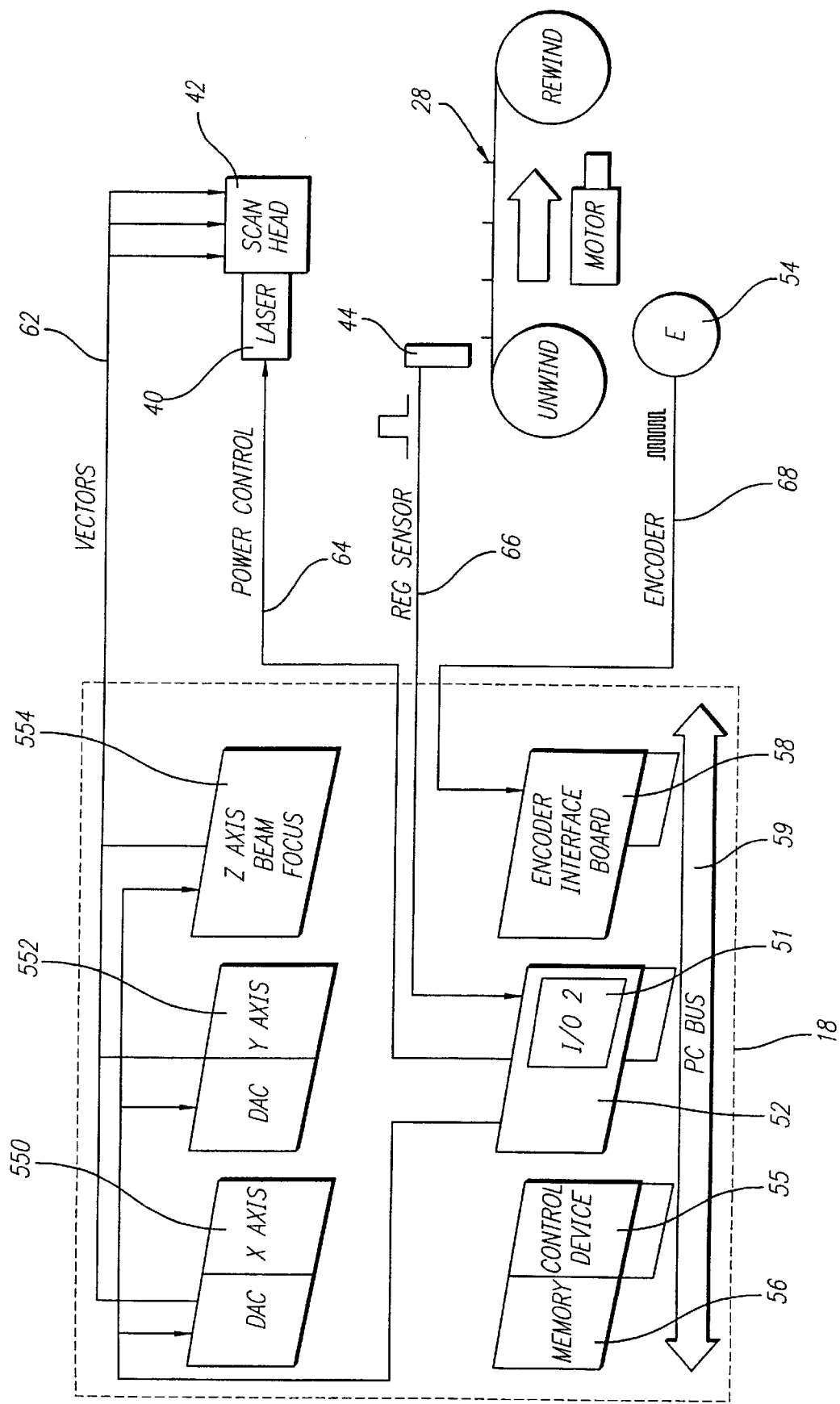
FIG. 5E is a further details of the diagrammatic representation of FIG. 5A.

As shown by way of example in FIG. 5E, further details of an exemplary embodiment of the control assembly 18 includes the control device 55 and the memory 56, as before, and further includes an interpreter circuit 52, an encoder interface board 58, an X axis interface 550, an Y axis interface 552, and an Z axis focus interface 554. In this embodiment, the control device 55 communicates with the interpreter circuit 52 and the encoder interface board 58, through a PC Bus 59 so that the control device 55 can control the scanner 42 and monitor the encoder 54. The encoder interface board 58 is used to communicate with the encoder 54. The interpreter circuit 52 is used to communicate with the scanner 42. Also, the registration sensor 44 communicates with the control device 55 through an input/output slot 51 provided within the interpreter circuit 52.

In this embodiment, the control assembly 18 preferably operates in the following manner; once the registration mark 22 has been detected, the control device 55 selects a configuration stored in the memory 56 that corresponds to the detected registration mark 28. The configuration is then outputted to the interpreter circuit 52, which converts the configuration into a series of X and Y vectors. These vectors are then outputted to the X and Y axis interfaces 550 and 552, which provides power to the X and Y axis mirrors in the scanner 42, respectively, to direct the mirrors to cut the configuration on the desired location on the moving web 22.

The Z axis focus interface 554 in this embodiment is used for controlling a lens (not shown) that travels along the axis of the laser to adjust the focal length of the laser. The focal length of the laser is adjusted in order to maintain the focal point on the flat surface of the target as the laser beam is directed to move horizontally. In other words, as the scanner 42 directs the laser beam to move horizontally on the flat surface of the moving web 22, the focal point maintains contact along the edges of the moving web 22 at it cuts, thereby keeping the focal point along the edges of the moving web 22.

Alternatively, as shown by way of example in FIG. 6A, a flat field lens 70 may be used to maintain the focal point on the edges of the moving web, in place of the Z axis focus interface 554. In this embodiment, the scanner 42 includes the flat field lens 70, which is used to further focus the laser beam provided by the laser device 40 to a focal point 72. Preferably, the flat field lens 70 can focus the laser beam to a focal point 72 with a focal diameter of approximately 0.004 to 0.006 inches (0.01016 cm to 0.01524 cm). Also, the flat filed lens 70 preferably has a flat field size of approximately 4 by 4 inches (10.16 by 10.16 cm). This allows the scanner 42 to direct the laser beam within the 4 by 4 inch (10.16 by 10.16 cm) perimeter of the target and still maintain the focal point on the flat surface of the target, i.e. as the scanner 42 directs the laser beam to move horizontally on the flat surface of the moving web 22, the focal point maintains contact along the edges of the moving web 22 as it cuts.

As illustrated by way of example in FIGS. 6(A, B, and C), another feature of this embodiment is to bevel the index tab edges as it cuts, in order to minimize the "paper cuts" that may be prevalent with a sharp edge. In this regard, the laser beam may be used to bevel the edges of the moving web as it cuts by adjusting the focal point 72 of the laser beam. As the laser beams converge at the focal point 72, the laser beams take on the shape of an hourglass, with the center of the hourglass being the focal point 72, for example. And as the focused laser cuts the edges of the moving web, the edges conform to the shape of the laser beam. Consequently, by focusing the focal point 72 along the centerline of the edge of the moving web 22, the edges may be substantially beveled by the laser beam having the hourglass shape. As shown in FIG. 6B, the focal point 72 cuts two beveled edges, an edge 80 and edge 82. Or as shown in FIG. 6C, by adjusting the focal point 72 along the top surface of the moving web 22, the focal point 72 cuts a beveled edge 84. Or as shown in FIG. 6D, by adjusting the focal point 72 along the bottom surface of the moving web 22, the focal point 72 cuts a beveled edge 86. By adjusting the focal point 72 vertically along the edge of the cutting material, variety of beveled edges may be cut.

As shown by way of example in FIG. 7, the scanner 42 may alternatively include a bifocal lens 81, which splits the laser beam provided by the laser device 40 into two laser beams 83 and 85, each with its own focal point F1 and F2, respectively. The focal point F1 is preferably directed at top of the moving web 22, thereby beveling along a top edge 87 and the focal point F2 is preferably directed at the bottom of the moving web 22, thereby beveling along a bottom edge 93. Consequently, substantially beveled edges are cut by the two laser beams 83 and 85 on the moving web 22.

As shown by way of example in FIG. 4, another feature of the laser assembly 14 in this embodiment, is to have a ventilation system that removes vapors and/or dust that may be generated by the laser beams cutting on the web. To remove the vapors and/or dust, instrument quality air is blown towards the cutting area of the moving web 22 and nearby exhaust vents are provided to remove the vapors and/or dust. In this regard, the ventilation system preferably includes an air filter blower 90, a dehumidifier 91, an air hose 92, a pair of air hoses 94, a top air knife 95, a bottom air knife 96, a lower exhaust vent 98, and a side exhaust vent 100.

The air filter blower 90 may be a unit manufactured by Grainger Inc., located 1270 Schabarum Ave., Irwindale Calif., 9170. The air filter blower 90 is used to filter out the particulate in the air and supply the clean air to the dehumidifier 91, which is used to remove moisture from the clean air. Thereafter, the instrument quality air is pumped through the air hose 92, subsequently the air supplies are divided by the pair of hoses 94, which are coupled to the top air knife 95 and the bottom air knife 96. The air supplies then exit through both of the air knives 95 and 96, which are coupled to the frame 46 so that they are adjacent to the moving web 22. Each of the air knives 95 and 96, being small in diameter, injects stream of air over the cutting areas of the moving web 22. Preferably, the stream of air supplied by both of the top air knife 95 and the bottom air knife 96 are directed so that the vapors and/or dust are contained away from the lens in the scanner 42, otherwise, the lens may get damaged over a period of time from a buildup of condensed vapor over the lens. To minimize such contamination, preferred working distance between the scanner 42 and the moving web 22 is approximately 8½ inches (21.59 cm). The air knives may be obtained from Exair Co., located 1250 Century Cir., Cincinnati Ohio, 45246.

To contain the vapors and/or dust, the top air knife 95 preferably directs the stream of air in a downward direction towards the cutting area of the moving web 22 (see FIG. 4), and at the same time the lower exhaust vent 98 underneath the moving web 22 removes the vapors and/or dust in that area that have been directed downward by the stream of air supplied by the top air knife 95. Furthermore, the bottom air knife 96 preferably directs the stream of air in a horizontal direction (see FIG. 4), where the vapors and/or dust are carried towards the side exhaust vent 100, for removal of vapors and/or dust in that area.

Focus now turns to various applications of the features described in the present invention. As illustrated by way of example in FIGS. 5B and 5C, one of the application is to cut sets of index tab sheets which are collated as they are cut by the DLCA 10. To cut sets of collated index tab sheets, the laser cutting assembly 14 first cuts along the edges of the moving web 22, sets of successive index tabs in different location. Thereafter, the sheeter assembly 16 cuts the individual index tab sheets from the moving web 22. Afterwards, as the individual sheets are cut, they are passed to a collection bin (not shown), where sets of collated index tab sheets are collected. As mentioned above this avoids the index sheet storage and collation steps needed with prior systems.

FIGS. 5B and 5C, illustrate one of the initial steps in cutting sets of successive index tabs along the edges of the moving web 22. In this regard, the control device 55 may be programmed to cut any number of tabs that are within a set, i.e. a user may program the control device 55 to cut seven or eight tabs in a set, or whatever is the requirement for that particular cutting run. The control device 55 is also preferably programmed to evenly distribute the tabs that are within a set. For example, if there are odd number of index tabs in a set, the middle tab is located at the center of the set, while other tabs are symmetrically distributed about the center. Also, the control device 55 is preferably programmed to vary the width of each tab 126 (see FIG. 5B(3)) depending on the number of tabs that are in a set, so that the width of the tab may be more generous if there are small number of tabs in a set, for example. At the same time, if there are too many tabs in a set so that all the tabs can not be fit into one successive series than the control device 55 is preferably programmed to evenly divide the tabs between two successive series of index tab sheets to form a set.

Alternatively, the memory 56 may be inputted with the dimensions of the individual index tab edges that makes up a set. For example, FIG. 5D shows an index tab edge 299, which is defined by a far left edge 300 having a width A, a left tab edge 302 having a width B, a tab edge 304 having a width C, a right tab edge 306 having a width D, and a far right edge 308 having a width E. The index tab 299 has a total length L, which is the sum of the widths A, B, C, D, and E. The index tab edge 299 may define one of the index tab edge within a set that needs to be cut. In order to cut a set, other index tab edges having different index tab location are also defined by varying the width of the edges 300 and 308, but maintaining the same total width L. Preferably the location of the index tabs are evenly distributed within the set. Also the width C of the tab edge 304 may vary depending on the number of index tabs that are in the set, if there are small number of index tabs in a set then the width C may be more generous.

Once all the index tab edges that makes up a set are defined, they are input into the memory 56. The control device 55 then select one of the index tab edge from the memory 56 to be cut on the moving web 22, so that sets of collated index tab sheets are cut. For example, as illustrated in FIGS. 5B(3–5), if a set has three index tab sheets, then the set would include a tab1 edge 121, a tab2 edge 131, and a tab3 edge 137, which has the three index tabs evenly distributed. FIG. 5B(3) shows the tab1 edge 121 defined by a far left edge 120, a left tab edge 124, a tab edge 126, a right tab edge 127, and a far right edge 128. Likewise, FIG. 5B(4) shows the tab2 edge 131 defined by a far left edge 130, a left tab edge 132, a tab edge 126', a right tab edge 133, and a far right edge 134. FIG. 5B(5) shows the tab3 edge 137 defined by a far left edge 136, a left tab edge 138, a tab edge 126", a right tab edge 139, and a far right edge 140.

Once the three index tab edges are defined and input into the memory 56, the three index tab edges 121, 131, and 137 may be cut preferably along the edge of the moving web 22. As illustrated in FIG. 5B(2), every registration mark 28 may be used as a reference point to initiate the cutting of the three index tab edges 121, 131, and 137 successively. The registration sensor 44 is used to detect the registration mark 28 along the moving web 22. Again, the registration marks are used to recalibrate the cutting of different index tab edges to minimize the distortion that may result from cutting on the moving web 22. Also, the control device 55 monitors the speed of the moving web 22, in order to determine the relative location of the moving web 22.

As illustrated in FIGS. 5B (2–5), once the first registration mark 28 is detected, the control device 55 outputs the data representing the tab1 edge 121 to the scanner 42. The data may be a series of X and Y vectors that represents the tab1 edge 121, to which the scanner 42 responds. The control device 55 monitoring the relative X and Y position of the moving web 22, timely inputs the vector signals to the scanner 42 to cut the tab1 edge 121 as the web 22 is moving. In other words, the series of X and Y vectors which defines the tab1 edge 121 can be cut along the desired X and Y position of the moving web 22 because the relative location of the moving web 22 is continuously monitored by the control device 55. The scanner 42 then responds to the series of X and Y vector signals to directs the laser beam to cut along the corresponding X and Y position of the moving web 22, to cut the index tab edge 121.

Once the scanner 42 finishes cutting the right tab edge 128 of the first tab, the second registration mark 28' is detected and the control device 55 recalibrate to cut the tab2 edge 131. And the above steps are repeated to cut the tab2 edge 131 defined by FIG. 5B(4). Likewise, once the scanner 42 finishes cutting the right tab edge 134, the registration mark 28" is detected, the control device 55 again recalibrate to cut the tab3 edge 137 defined by FIG. 5B(5), which is the third and last index tab sheet in this example set. After the last index tab sheet in the set is cut, the whole process repeats itself so that the next registration mark represents the tab1 edge 121.

FIG. 5C shows the tab edges 121, 131, and 137 being cut successively along the edge of the moving web 22. Preferably the successive index tab edges are cut along the moving web 22 so that the left over edge is a continuous strip 142. The continuous strip 142 may be removed through a vacuum funnel 144, which creates a region of low air pressure near the continuous strip 142 to suck the strip 142 away from the cutting area. Also, the registration marks are preferably printed on the continuous strip 142 so that the registration marks do not show on the index tab sheets.

It should be noted that the registration marks are used by the control device 55 as a reference points along the moving web 22 that indicates periodic distance from one registration mark to another, in this example 11 inches (27.94 cm) apart.

As an alternative to printing the registration marks on the moving web, a cylinder (not shown) which rotates in sync with the moving web may be used to indicate the periodic distance between one registration mark to another. For example, if the preferred periodic distance is 11 inches, then a cylinder having a circumference of 11 inches with a registration mark on the cylinder may be used. In this way, as the cylinder rotates in sync with the moving web, the registration sensor 44 detects the registration marks from the cylinder.

Focus now turns to the laser device 40, which is used to provide the laser beams necessary to cut the moving web 22. In this regard, the laser device 40 may be a 240 Watt, sealed $CO_2$ laser manufactured by Coherent Inc., located at 5100 Patrick Henry Drive, Santa Clara Calif., 95054. The speed of the web is largely dependent on the power of the laser because greater energy is required to cut a faster moving web. For example, with a 240 Watt laser gun, a preferred speed of the web is approximately 200 to 300 feet/min (60.96 to 91.44 meters/sec) for cutting a 90 pound (40.5 kg) paper or approximately 300 feet/min (91.44 meters/sec) or more for cutting a 30 pound (13.5 kg) paper. However, with a 500 Watt laser, the speed of the web may be increased to 1,000 feet/min (304.8 meters/sec) for a 30 pound (13.5 kg) paper. Incidentally, when the phrase 90 pound (40.5 kg) or 30 pound (13.5 kg) stock or paper is employed, reference is made to the weight of 500 sheets of paper 26 inches by 36 inches in size (66.04 by 91.44 cm).

As shown by way of example in FIGS. 1 and 7, after the successive index tab edges have been cut by the scanner 42, the moving web 22 is passed to the sheeter assembly 16 for cutting individual index tab sheets along the perpendicular edge 150 that is preferably 11 inches (27.94 cm) apart (hereinafter referred as sheeting). Sheeting of the moving web 22 may be done in number of ways. As illustrated by way of example in FIG. 9, a traditional die mechanism may be used for sheeting. According to this embodiment, the sheeter assembly 16 includes a rotary die 160, a cutting member 162, and a backup roller 164. Viewed broadly, as the moving web 22 passes between the rotary die 160 and the backup roller 164, the cutting member 162 cuts along the perpendicular edge 150 of the moving web 22 eleven inches (27.94 cm) apart, thereby separating the successive index tab sheet from the moving web 22. Thereafter, the successive index tab sheet is passed to a bin for collection.

Alternatively, a second scanner 151 may be used for sheeting, as illustrated by way of example in FIG. 8. Here, the second scanner 151 is preferably position adjacent to the scanner 42, which is also controlled by the control device 55.

In order to cut the perpendicular edge 150, the configuration that defines the perpendicular edge 150 is stored into the memory 56, in this case a straight perpendicular line. The control device 55 also converts the perpendicular edge 150 to a series of X and Y vectors. Additionally, the same registration mark 28, which was used as the reference point to cut the index tab edge, is used as the reference point to cut the perpendicular edge 150. The control device 55 monitoring the relative location of the moving web 22 inputs the series of X and Y vectors to the scanner 151 to cut along the relative X and Y position on the moving web 22 to cut the perpendicular edge 150.

As illustrated in FIG. 8, to cut the perpendicular edge 150, the scanner 151 directs the laser to cut diagonally between an edge 152 and edge 154 at a certain angle θ. It should be noted, the laser may initiate cutting along either side of the edges 152 or 154. Also based on the speed of the moving web 22, the control device 55 controls the scanner 151 to adjust the diagonal speed of the laser and the angle θ that the laser is taking. At the same time, the power level of the laser is also adjusted based on the speed of the moving web 22 in order to deliver consistent amount of energy for cutting. Additionally, to cut diagonally, the scanner 151 is preferably provided with a lens that has a flat field size of approximately 12 by 12 inches (30.48 by 30.48 cm), so that the focal point of the laser maintains contact along the edges of the moving web 22 as it cuts diagonally. Accordingly, the DLCA 10 cuts consistently and accurately during the whole process, even though speed of the web 22 may vary during the cutting process.

It should be noted, that the sequence of the operations as described above is not to be taken in a limiting sense, but is made merely for the purpose of illustrating the general principles of the invention. For example, the scanner 151 may be placed ahead of the scanner 42, for sheeting the web 22 before the successive index tab edges are cut by the scanner 42. In this example, the leading edge of the sheets may be used as the registration marks, thereby, eliminating the need for separately printing the registration marks on the moving web.

Yet another embodiment of the present invention may have a feeder (not shown), rather than the conventional press 12, for successively feeding pre-cut sheets into the DLCA 10. Accordingly, in this embodiment the moving feed stock is the successive sheets fed from the feeder, and the leading edges of the sheets may be used as the registration marks. As the feeder feeds the successive sheets into the DLCA 10, the cutting of the successive index tab edges are essentially same as the embodiment described above, except that the sheeter assembly 16 is no longer needed. For example, in this embodiment the control device 55 preferably communicates with the encoder 54 and the registration sensor 44 to monitor the speed of the moving sheets and the leading edges of the sheets, respectively. Once the leading edge of a sheet is detected it is used as a reference point to recalibrate the exact location of the moving sheet; and based on the speed of the sheet, the control device can continuously monitor the relative location of the sheet, enabling the control device to send the output signal to the scanner to cut the corresponding index tab edge on the desired location of the sheet. It is further noted that successive sheets may have different index tabs cut into the sheets while the successive sheets are momentarily held stationary under the laser cutting head; and the resultant set of index tab sheets are formed without collation.

Figure 14:
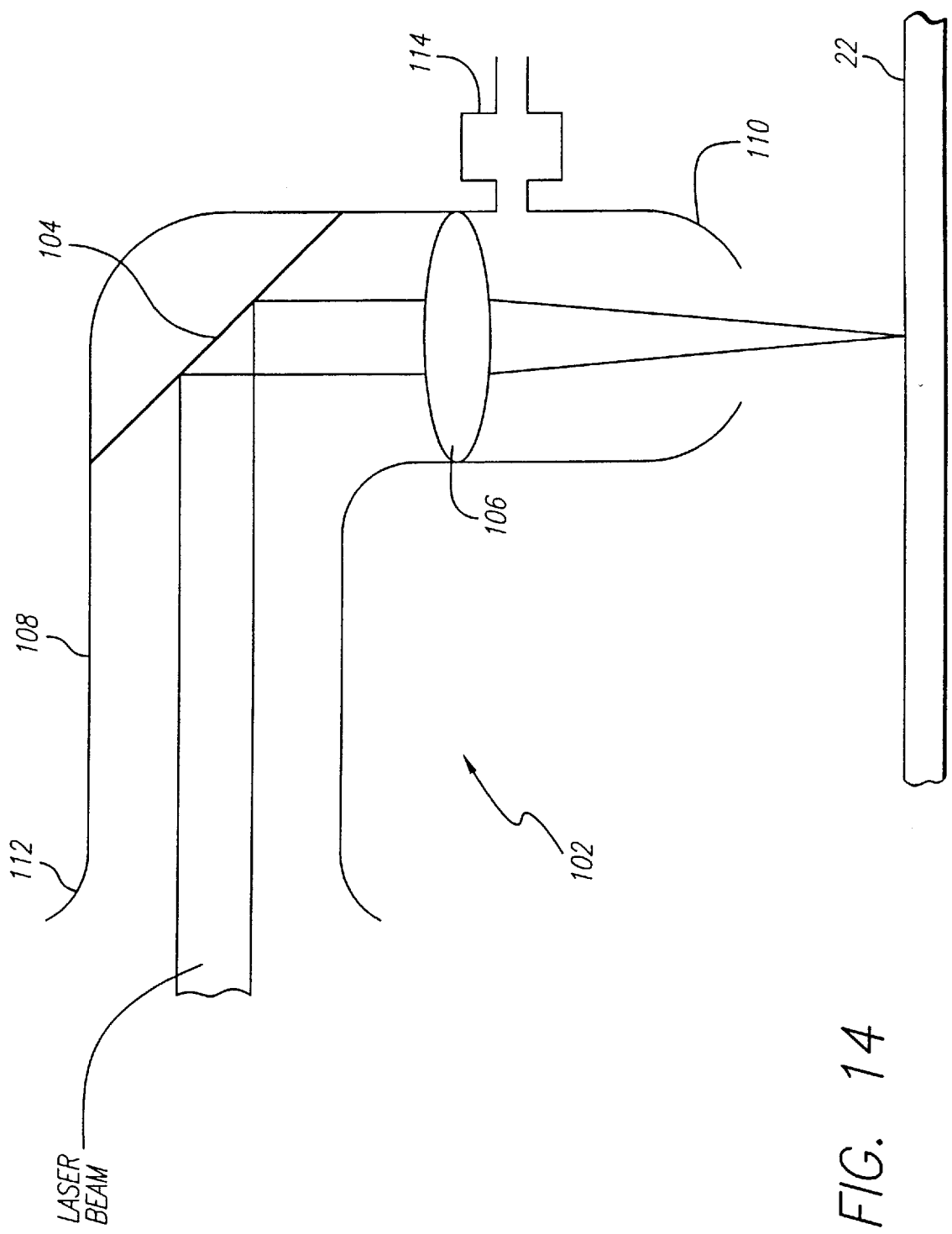
FIG. 14 is a front view of an optional supplemental laser cutting unit.

As illustrated in FIGS. 3 and 14, another embodiment of the present invention may also include a laser cutting tool 102 for a slitting operation, i.e. cutting along the opposite edge 154 (shown in FIG. 8), in order to make more accurate dimensional cut of the index tab sheets. The laser cutting tool 102 is preferably coupled over the moving web 22 (see FIG. 3) and position so that accurate dimensional width of the index tab sheets may be cut. As illustrated by way of example in FIG. 14, the laser cutting tool 102 preferably has a housing 108, which includes an open end 112, an open nipple end 110, and an air adapter 114. The housing 108 also include a turning mirror 104 and a focusing lens 106. Functionally, the open end 112 receives the stream of laser from the laser gun, the laser beam is then deflected off of the turning mirror 104 down towards the focusing lens 106, where the laser beam is further intensified. To cool the focus lens, ventilation is provided by the air adapter 114. Thereafter the intensified laser beam exits through the open nipple end 110, thereby cutting along the edge 154 as the moving web 22 moves across.

Figure 10:
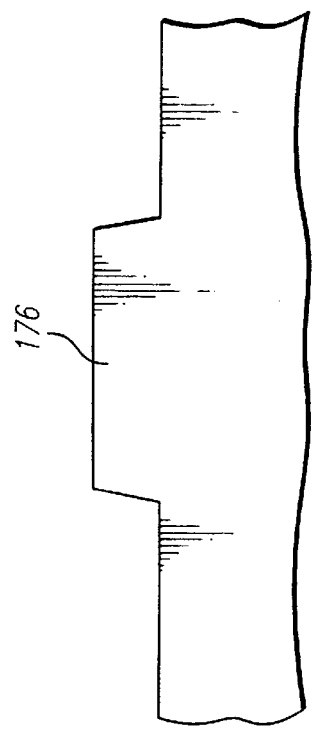
FIG. 10 is an exemplary view of a tab having the general shape of a rectangle.
Figure 11:
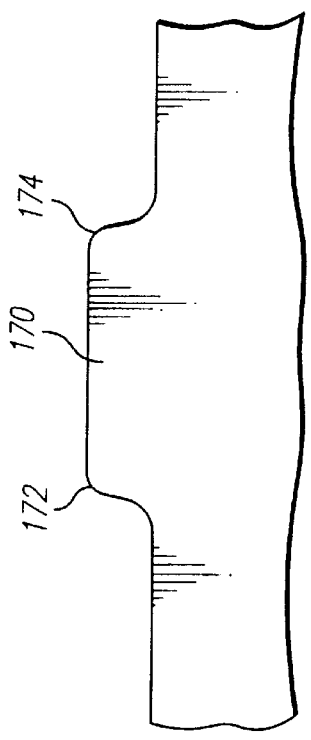
FIG. 11 is an exemplary view of a tab having the shape of a portion of a hexagon.
Figure 12:
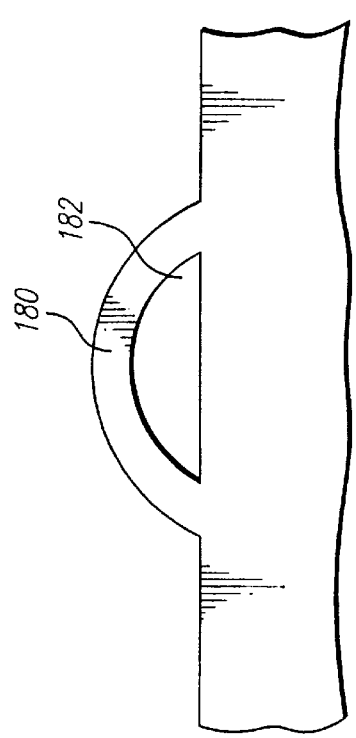
FIG. 12 is an exemplary view of a tab having the shape of a half circle.
Figure 13:
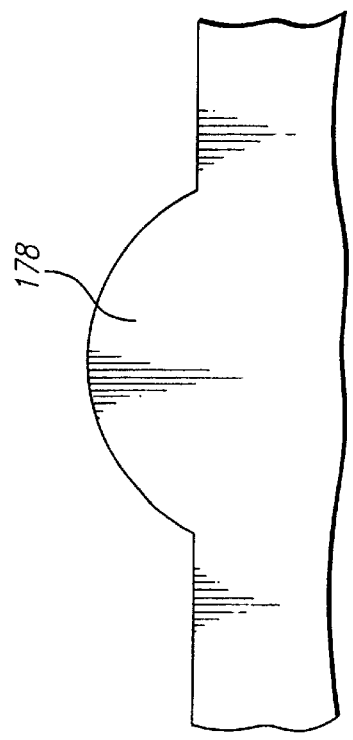
FIG. 13 is an exemplary view of a tab having the shape of a half circle with an opening.

As illustrated by way of example in FIGS. 9–12, another feature of the present invention is the flexibility of cutting different configurations of tabs. For example, FIG. 10 shows a common tab 170 that has a shape of a rectangle with a round edges 172 and 174, FIG. 11 shows a tab 176 that has a shape of a portion of a hexagon, and FIG. 12 shows a tab 178 that has a shape of half circle. Alternatively, FIG. 13 shows a tab 180 that has a shape of a half circle with an opening 182.

As shown above, the control device 55 may be programmed to cut most any sizes and shapes of index tabs along the moving web. Also, control device 55 may be programmed to cut successive index tab sheets having combination of different shaped index tabs, i.e., a set may include index tab sheets having a combination of the tabs 170, 176, 178, or 180, or any other combination thereof. Accordingly, certain shaped tab may represent particular location within a set. For example, a set consisting of three index tab sheets may have the rectangular shape tab 170 representing the first tab in the set, and the hexagon and half circle tabs 176 and 178 representing the second and third tabs in the set, respectively. Also, the tab edges such as 170 are cut by continuous laser beam, which results in having the rounded corners such as 172 and 174 being smooth and continuous, unlike die-cutting, which can result in jagged or disjointed index tab edges.

As shown by way of example in FIG. 8, another application of the present invention is to cut three ring binder holes 156 along the opposite edge 154 of the index tab sheets so that the tab sheets may be placed in a three ring binder. In this regard, a scanner like the scanner 151 may be used for cutting the three binder holes 156, instead of sheeting as described above. The control device 55 is preferably programmed to initiate the laser cutting of the first of the three holes 156 using the registration mark 28 as the reference point, which is similar to how the index tabs are cut using the registration mark 28 as its reference point.

Figure 31:
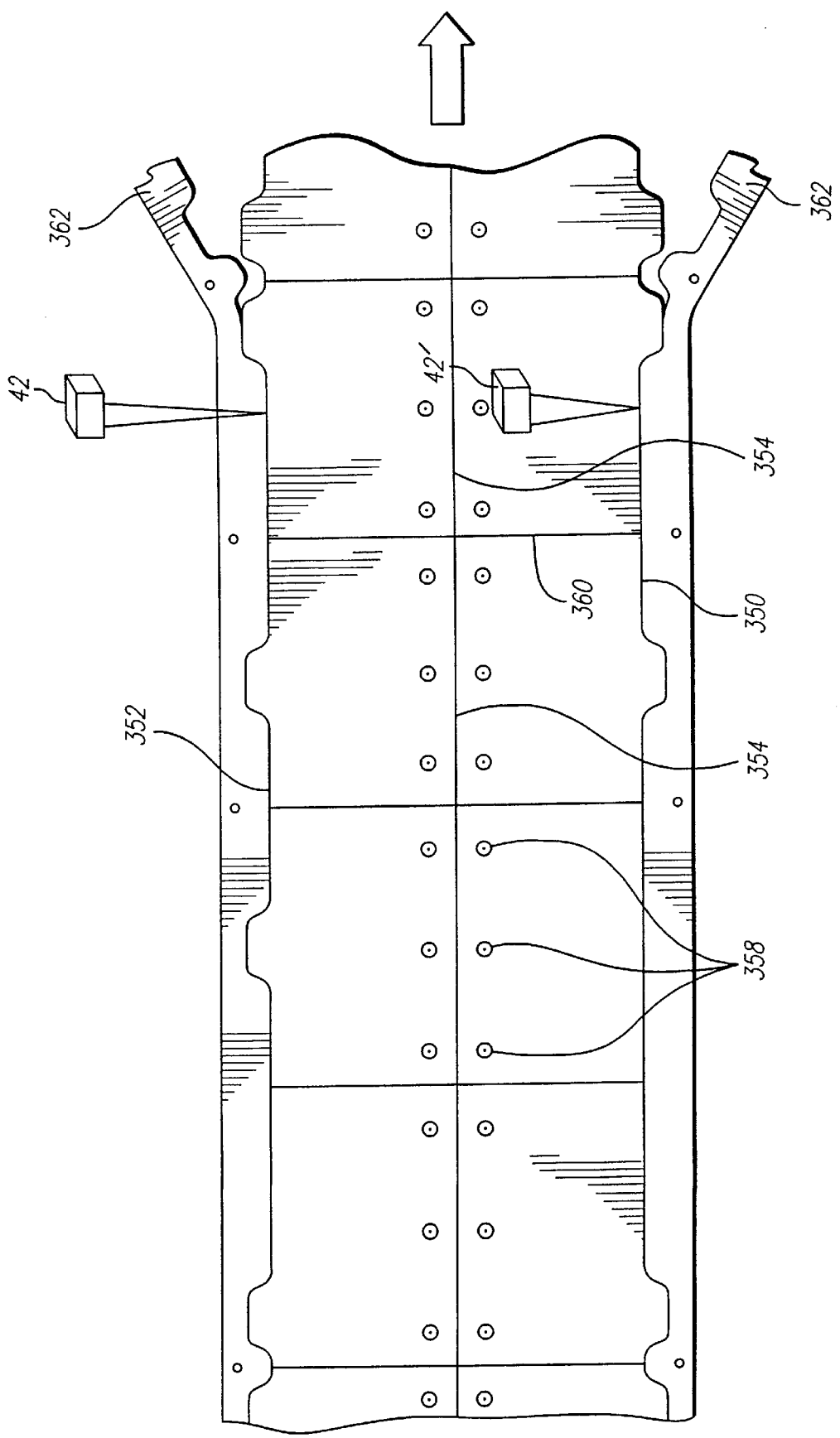
FIG. 31 is a top view of a web having successive index tab edges cut on both edges of the moving web.

As illustrated by way of example in FIG. 31, another embodiment of the present invention has a second scanner 42' to cut another set of successive index tab edges 350. The successive index edges 350 is mirror image of a successive index tab edges 352, both having the four index tabs in a set. In this embodiment, cutting is done similar to cutting of the successive index tab edges, as shown in FIG. 5C. Except with this embodiment the computer 50 inputs vectors signals to both of the scanners 42 and 42' to cut the edges 352 and 350, respectively. This embodiment also includes the cutting tool 102 (not shown) for slitting along a centerline 354. This embodiment may also include a third scanner 42" (not shown) for cutting the three holes 358, which is controlled by the control device 55. Likewise, a fourth scanner 42'" (not shown) may be added to this embodiment to cut along a perpendicular edge 360 for sheeting of the index tab sheets from the moving web 356. After the index tab edges 350 and 352 have been cut, both of continuous strips 362 may be discarded by the vacuum funnel 144. Advantage with this embodiment is that by adding the second scanner 42', the DLCA 10 can doubled its production of index tab sheets.

As shown by way of example in FIG. 15, another feature of the present invention is to cut the successive index tab edges that are perpendicular to the edge of a moving web 190. In order to accomplish this objective, the moving web 190 preferably has a width 202 that is equal to the width of the index tab sheet desired to be cut, which is 11 inches (27.94 cm) for most standard index tab sheets. Additionally, the moving web 190 is periodically printed with registration marks 192, which indicates the beginning of the next successive index tab edges to be cut. In this case, the registration marks 192 may be printed every 9 inches (22.86 cm), which is the distance between the top and bottom of most index tab sheets.

In this embodiment, cutting of the perpendicular tab edge 196 is similar to cutting the perpendicular edge 150, except that individual perpendicular edge 196 with successive tabs in different locations, which makes up a set, are stored in the memory 56. Again, using the registration marks as the reference points, the control device monitors the relative location of the moving web 22. The control device 55 then outputs the vector signals representing a particular index tab location to the scanner 42 to direct the laser to cut the index tab edge on the desired perpendicular edge of the moving web 22. Subsequently, at every registration mark, another perpendicular edge with different tab location is cut. As a result, sets of collated index tabs are cut directly from the present invention.

As illustrated by way of example in FIG. 16B, another application of the present invention is to cut sets of manila file folders so that they are collated as they are cut by the laser cutting assembly 14. Generally, manila file folders comes in sets of three file folders having different tab locations, i.e. the first tab in the far left, the second tab in the middle, and the third tab in the far right; and each file has a pair of edges. For instance, as shown in FIG. 16C, a file folder 320 has the index tab in the far right with a first edge 322 and a second edge 324.

Cutting the manila file folders is similar to cutting the sets of successive index tab edges, as shown in FIG. 5C, except with this application a second scanner 222 is added to cut a second successive tab edges 330, and the scanner 42 is used to cut a first successive tab edges 328. Both of the edges 328 and 330 are substantially similar, with the first edge 328 evenly distributing the three tabs within a set and the second edge 330 evenly distributing the three recesses within a set, respectively. Additionally a moving web 326 has a width W that is greater than 17¾ inches (45.085 cm), which is the distance between the first edge 328 and second edge 330. Cutting of manila file folders is substantially similar to cutting the sets of successive index tab edges, except here the control device 55 inputs vector signals to both of the scanners 42 and 334, to cut both of the edges 328 and 330, respectively. Also, with this application, another continuous strip 334 is formed, which is preferably removed by another vacuum hose 144.

Once the edges 328 and 330 have been cut, a perpendicular edge 338 may be cut by a third scanner (not shown) or by the die-cutting assembly 16, as mentioned above. Additionally, the cutting tool 102 may be coupled over and along the centerline of the moving web 326 to cut a line of weakness 340, i.e. cut slightly but not through the moving web 326 so that the folders may fold easily along the line of weakness 340.

Alternatively, as illustrated in FIG. 16A, the tabs for the manila file folder may be cut perpendicular to the edge of the moving web 210, similar to cutting the successive index tab edges on the perpendicular edge of the moving web 190, as illustrated in FIG. 15. However, in this case, the registration marks 214 are printed on the moving web 190 preferably every 17¾ inches (45.085 cm), which is the distance between a first edge 210 and second edge 212 for a standard commercial manila file folder. Also, a second scanner 222 is preferably used to cut the second edge 212, instead of sheeting. Alternatively, the first scanner 42 is used to cut the first edge 210. However, the control device 55 may have either of the scanners 42 or 222 cut either of the paired edges 210 or 212. After the edges for the file folder 216 have been cut, a second pair of edges for an another manila file folder having next tab location may be cut.

Viewed broadly, once the control device 55 receives the detection of the registration mark 214 which corresponds to the cutting of file folder 216, the control device 55 directs the first scanner 42 to cut the first edge 210 and the second scanner 222 to cut the second edge 212. Thereafter, the control device 55 receives the detection of another registration mark 214 that corresponds to a file folder 218 having a first edge 219 and a second edge 220, which has the next tab location. The control device 55 then directs the first scanner 42 to cut the first edge 219 and the second scanner 222 to cut the second edge 220. And this process is repeated to cut the successive manila file folders. Once the cutting is done, the collated manila file folders may be collected from the press so that the collated manila file folders may be boxed for a commercial product.

Figure 17:
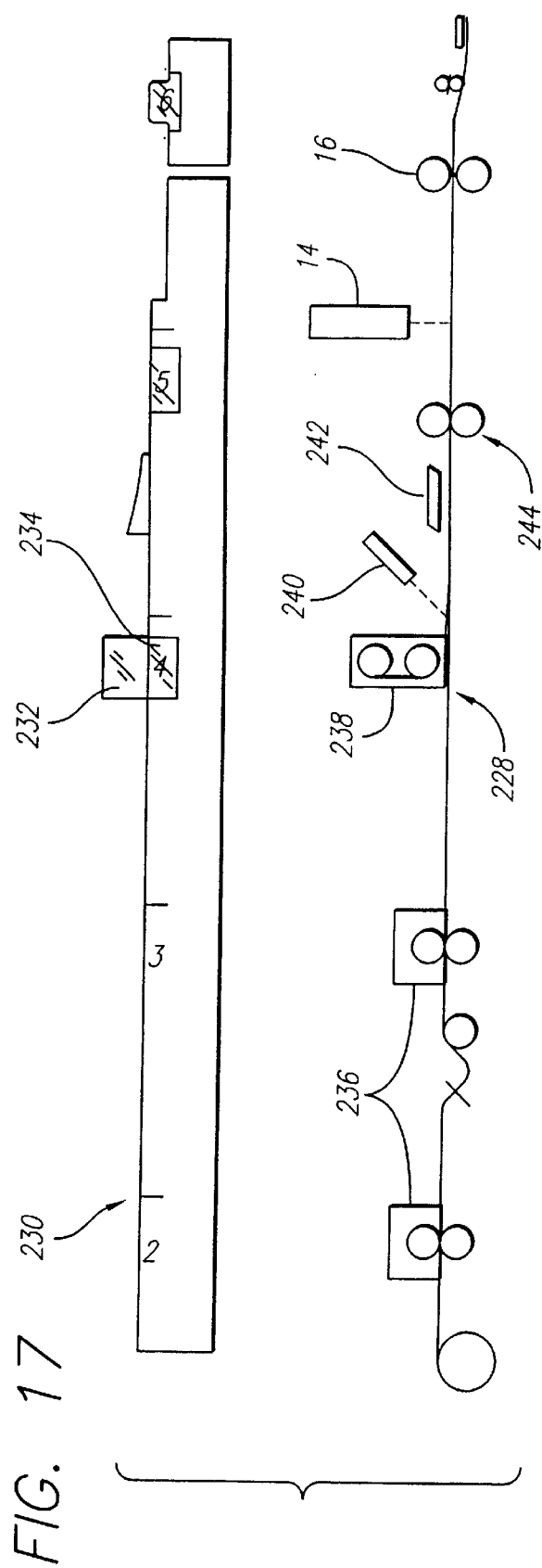
FIG. 17 is a layout of another embodiment of the present invention in which symbols are printed on the tab area of the moving web and the tabs are then covered with a film.

Another application of the present invention is illustrated by way of example in FIG. 17, to cut sets of successive index tab sheets, where the tabs have a variable printing and are protected by a layer of transparent film. To accomplish this objective, a laser cutting and printing assembly 228 includes a registration mark 230 as used before for indicating the beginning of the successive index tab sheets to be cut, a variable printing station 236 for printing symbols on the tab area, an applicator 238 for applying a layer of protective film 232 on the tab area, a laser cutter 240 for cutting the film onto the tab area, a folder 242 for wrapping the protective film 232 over the tab area, a heater 244 for bonding the film 232 to the tab area, and the laser cutting assembly 14 for cutting the successive index tab edges.

In this application, the control device 55 is preferably programmed to controls the laser cutting and printing assembly 228, similar to the way it controls the laser cutting assembly 14. As before, the control device 55 uses the registration mark 230 as the reference point for cutting the next successive index tab sheet. Once the registration mark 230 is detected, the control device 55 then assigns a particular index tab location to that registration mark 230 throughout the printing and laser cutting process. For example, the registration mark 230 may be assigned to a tab area 234. Thereafter, the control device 55 then controls the printing station 236 to print a symbol on the web where that particular tab is to be cut, or in this example the tab area 234. The printing is preferably done by a digital printer, so that any symbol of shapes and sizes may be printed on the tab area. Alternatively, laser may be used to burn the symbol on to the tab area.

After the printing, the control device 55 controls the applicator 238 to apply the layer of protective film 232 that is sufficient to cover the tab area 234 on both sides. As shown in FIG. 17, one half of the film 232 is applied to the one surface area of the tab area 234. Then the laser cutter 240 is used to cut off the layer of protective film 232 from the applicator. Preferably, the layer of protective film 232 that is cut off has slightly greater length than the width of the tab area 234. Afterwards, the folder 242 is used to wrap the layer of film 232 over the other side of the tab area 234. The protective film 232 may be heat sensitive, such as mylar, so that it may be bonded to the tab area 234 from the heat provided by the heater 244, or it may also be ultrasonically bonded. Alternatively, commercially available pressure sensitive adhesives or linerless adhesives may be used to wrap the tab area 234, thereby, eliminating the need for providing heat from the heater rolls 244. Thereafter, the laser cutting assembly 14 is used to cut the index tab edges along with the excess layer of film 232. And then the sheeter assembly 16 is used to cut the index tab sheet with the tab area 234 from the moving web 22, thereby, cutting the tab area 234 with the symbol printed by the printing station 236 and the layer of film 232 over the tab area 234 to provide a layer of protection. This process is then repeated using the registration marks as the reference point to cut sets of successive index tab sheets with the symbol and film over each successive index tab sheets.

Figure 18:
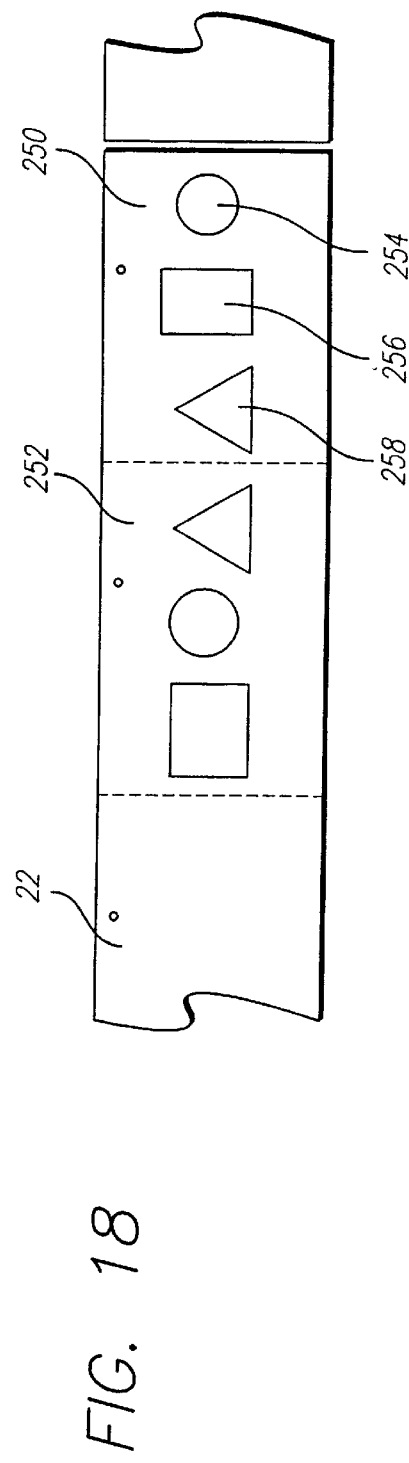
FIG. 18 is a top view of the moving web having different geometric figures cut by the laser beam.

As illustrated by way of example in FIG. 18, another application of the present invention is to cut sheets having a variety of configurations, each configuration may have different shapes and sizes, such as a circle 254, a rectangle 256, or a triangle 258. In order to cut these configurations, the above mentioned configurations are stored in the memory 56, the control device 55 can then cut any one of the above configurations any place along the relative X and Y position of the moving web 22. For example, a sheet 250 may be cut in the following sequence: first the circle 254, second the rectangle 256, and third the triangle 258. On the other hand, a sheet 254 may be cut in the following sequence of: the triangle 258, the circle 254, and the rectangle 256, or any other combination thereof, in any place along the moving web 22.

Figure 24:
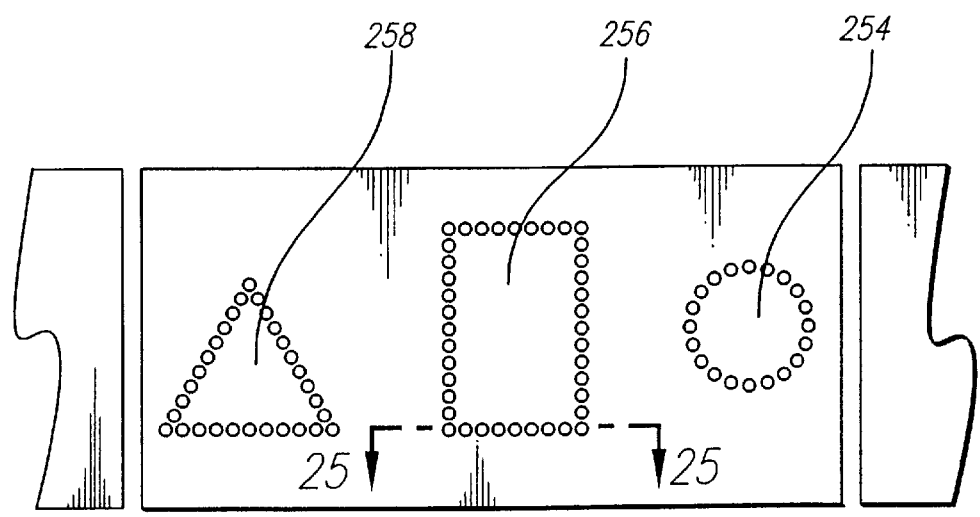
FIG. 24 is a top view of a laser micro-perf cutting on a web the configurations shown in FIG. 18.
Figure 25:
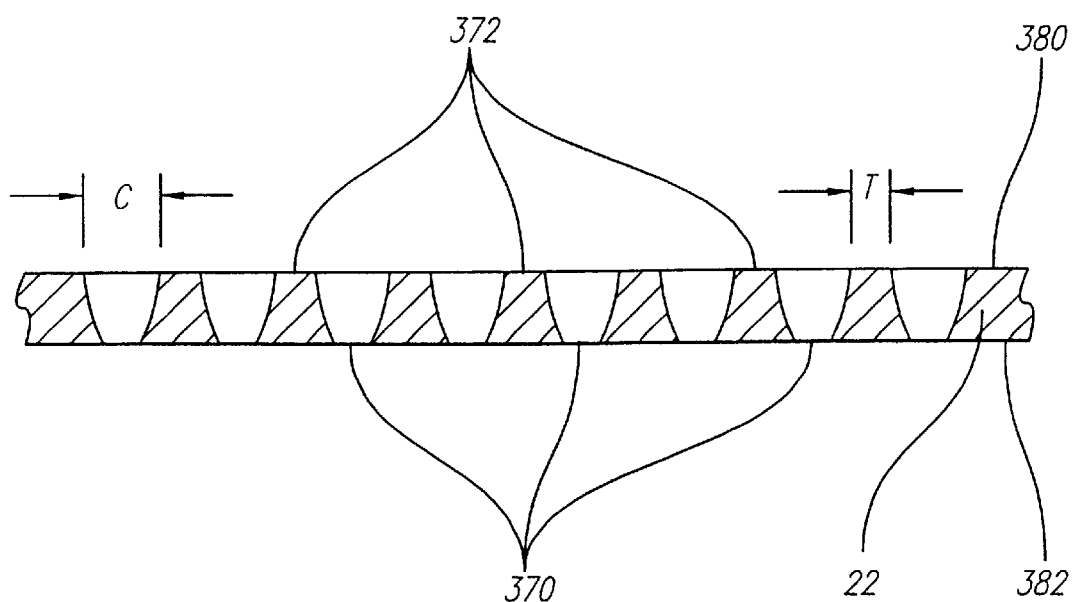
FIG. 25 is a cross-sectional view of the micro-perf cutting on the web of FIG. 24.
Figure 26:
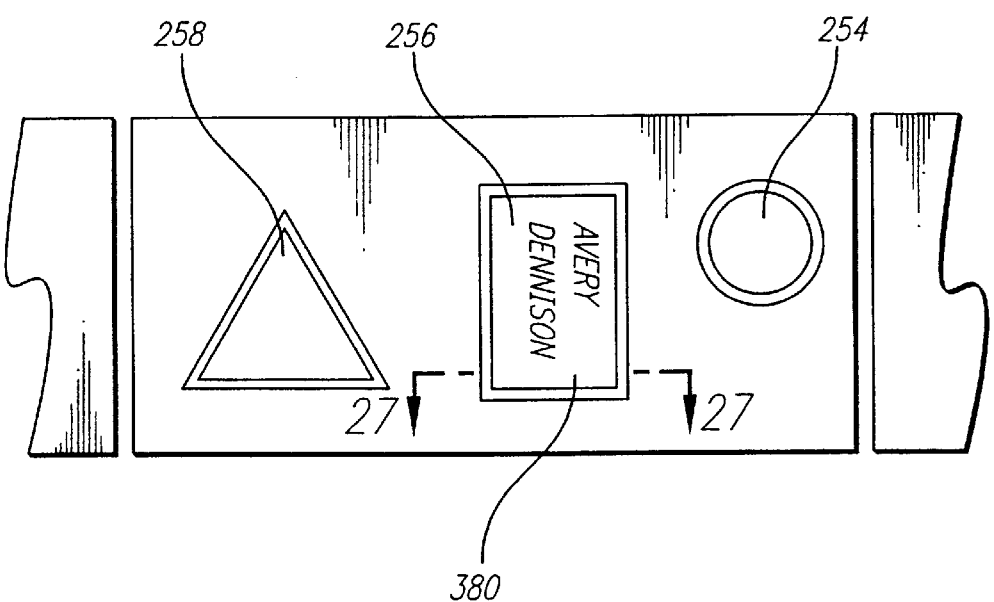
FIG. 26 is a top view of a laser deep micro-perf cutting on a web the configurations shown in FIG. 18.
Figure 27:
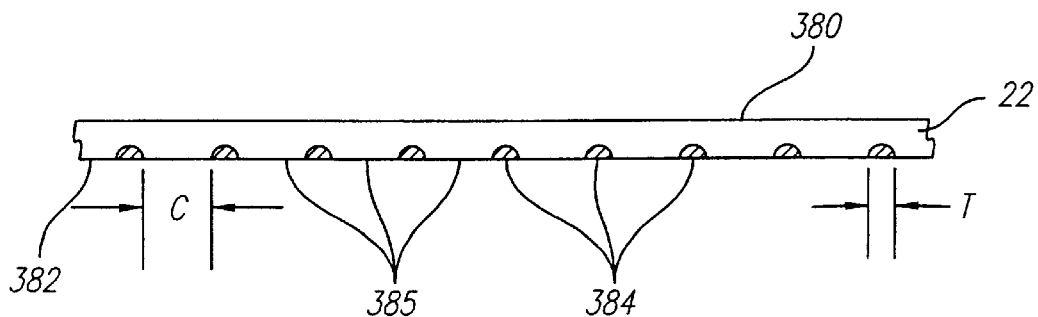
FIG. 27 is a cross-sectional view of the deep micro-perf cutting on the web of FIG. 26.

Additionally, the above mentioned configurations may be cut by partial cutting, such as scoring or micro-perfing on the moving web 22, as illustrated by way of example in FIGS. 22 and 24–30. Again, to make such cuts, the control device 55 precisely controls the power level of the laser to cut a line of weakness along the moving web 22, so that the configurations may be separated from the sheets. More specifically, the power level of the laser is controlled for a perforation, or "perf" cutting, by controlling the pulse period of the laser to cut a series of successive cuts 370 and ties 372 that are alternated. FIG. 24 shows the variety of configurations that may be cut via micro-perf cutting, such as the circle 254, rectangle 256, and triangle 258. The micro-perfing is generally described as having the width of the cuts 370 or "c" as being greater than 0.001 inch (0.00254 cm) and the width of the ties 372 or "t" as greater than 0.0005 inch (0.00127 cm). Preferably, the control device 55 may adjust the pulsating period of the laser device 40 to control the widths of the cuts "c" and ties "t", and to maximize the number of series of cuts 370 and ties 372 which are made to cut a configuration. It should be noted that the dimensions on these drawings are exaggerated for the illustrative purposes. As shown in FIG. 25, in order to cut the successive cuts 370 and ties 372, the control device 55 pulsates the power level of the laser so that the laser has enough power to cut through the web 22 at the cut 370 but no power at the tie 372. Consequently, the series of successive cuts 370 and ties 372 may be viewed from the first side 380 and second side 382. The micro-perf cutting is used to create a line of weakness, where a user may tear along the micro-perf line.

As illustrated by way of another example in FIGS. 26–30, the power level of the laser may also be controlled to cut a series of deep micro-perf cuts 385 and ties 384. Similar to FIG. 24, a variety of configurations may be cut, such as the rectangle 256, where the rectangle 256 may be used as a business card, for example with printing on the first side 380. But in this example, the first side 380 has a clean cut and the series of cuts 385 and ties 384 are only on the second side 382. As shown most clearly in FIG. 27, the control device 55 controls the power level of the laser to cut through the first side 380 leaving a clean cut. But at the second side 382, the power level of the laser is controlled to pulsate to cut a series of cuts 385 and ties 384. The cuts 385 have cut through the second side 382 but the ties 384 have not, which holds the rectangular configuration or business card 256 still tied to the web 22.

Figure 29:
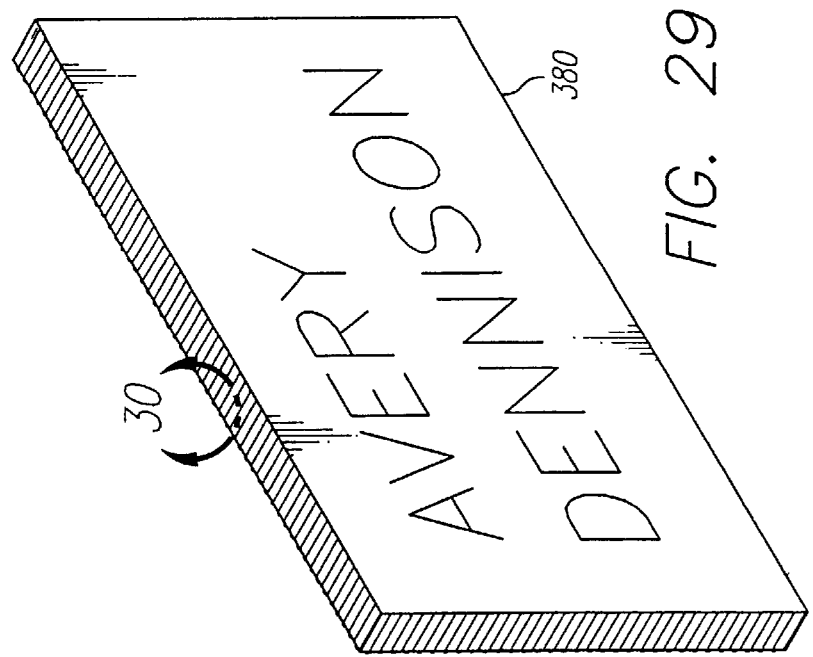
FIG. 29 is a front view of the rectangular configuration of FIG. 26 after it has been torn along the deep micro-perf cut.
Figure 30:
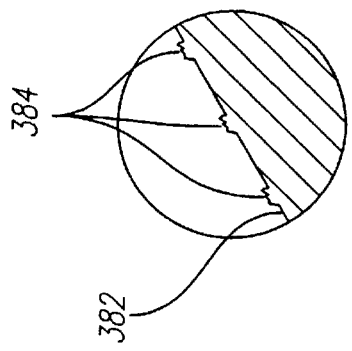
FIG. 30 is a enlarged view of the encircled area of FIG. 29.
Figure 28:
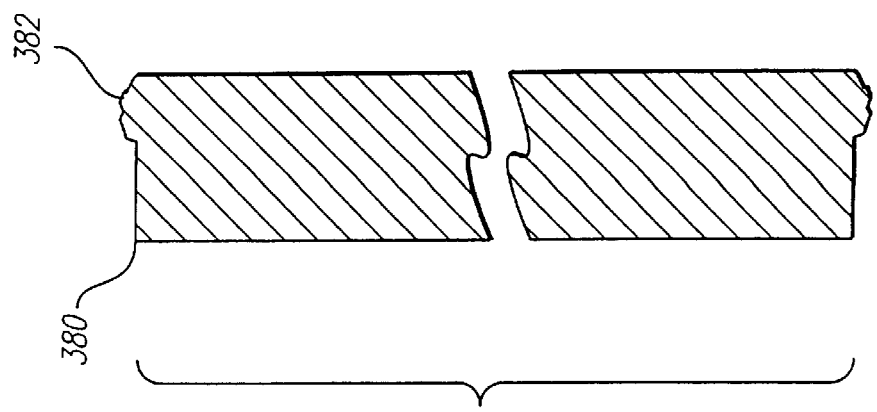
FIG. 28 is a side cross-sectional view of the web in FIG. 26 after it has been torn along the deep micro-perf cut.

The series of cuts 385 and ties 384 creates a line of weakness along the laser cut, which may be separated easily by applying nominal tension along the line of weakness. As shown in FIGS. 28–30, one of the advantages with the deep micro-perf cutting is that the first side 380 has a clean cut, so when viewed from the first side 380, the viewer will only see the aesthetically pleasing clean cut without noticing the tears along the second side 382. As a result, user may for example, as shown in FIGS. 29–30, use a laser printer to print customized information on the first side 380, then tear the configuration from the sheet and use it for advertising, business cards and the like. It should be noted that the dimensions on these drawings are exaggerated for the illustrative purposes.

Figure 19:
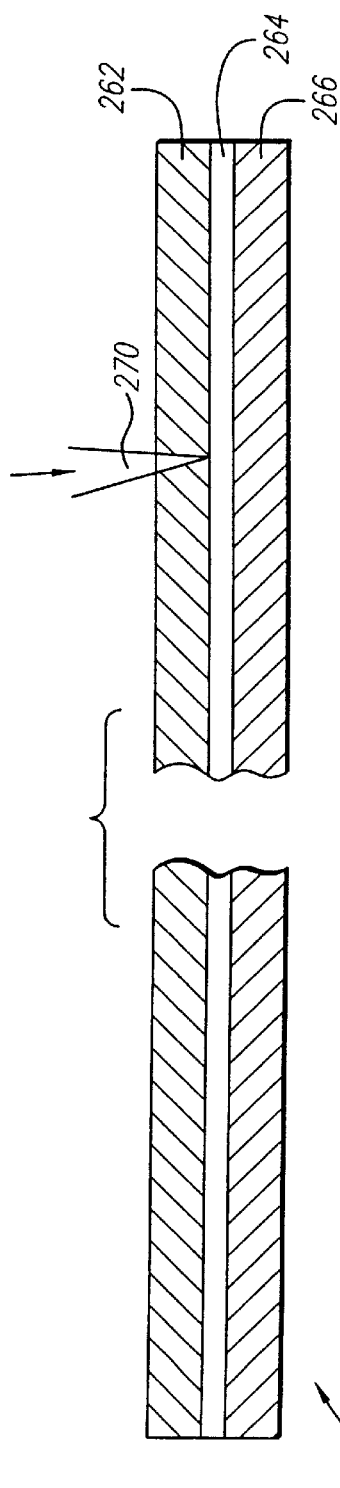
FIG. 19 is a schematic cross-sectional view of a web having multilayer label stock with the face stock cut by a laser beam to form individual labels.

Focus now turns to different types of web that may be used with the present invention, to cut the variety of configurations, such as the configurations shown in FIG. 18. As illustrated by way of example in FIG. 19, a multilayer or PSA web 260 may be used to cut a plurality of configurations, which has four basic material components: a printable layer or face stock 262 with an approximate thickness of 0.003 to 0.01 inch (0.00762 to 0.0254 cm), a release coated backing layer 266 with an approximate thickness between 0.003 to 0.01 inch (0.00762 to 0.0254 cm), an intermediate pressure sensitive adhesive layer 264 with an approximate thickness of 0.001 inch (0.00254 cm), that adheres the printable layer and the backing layer together, and the backing layer 262 preferably has a conventional release coating such as silicone (not shown) with an approximate thickness of 1.0 $\mu$m on the side that adheres to the adhesive layer 264 for convenience in peeling back the printing layer 262. Another multilayer web may be a linerless web (not shown), which is similar to the PSA web 260 but without the backing layer 266. Viewed another way, the linerless web may be seen as being similar to a roll of scotch tape that has an adhesive side, with the opposite side having a release coating which is printable.

The present invention may cut variety of labels on the moving web 260 having different shapes or sizes, like the configurations shown in FIG. 18. To cut a label from the moving web 260, the control device 55 controls the power level of the laser to cut the face stock layer 262 and the adhesive layer 264, but not the backing layer 266, i.e. scoring. One of the advantages of laser cutting the adhesive layer 264 is to evaporate the adhesives in the cutting area, in order to prevent the adhesives from squeezing out. Again, depending on the speed of the web 260, the control device 55 precisely controls the power level of the laser so that only enough energy is provided to cut the face stock layer 262 and the adhesive layer 264. Accordingly, a variety of labels having different shapes and sizes are cut having a printing area on one side and an adhesive on the other side. It should be noted, however, that with the present invention, the energy level of the laser may be precisely controlled to cut a desired depth within a few tenths of a thousandth of an inch.

Figure 32:
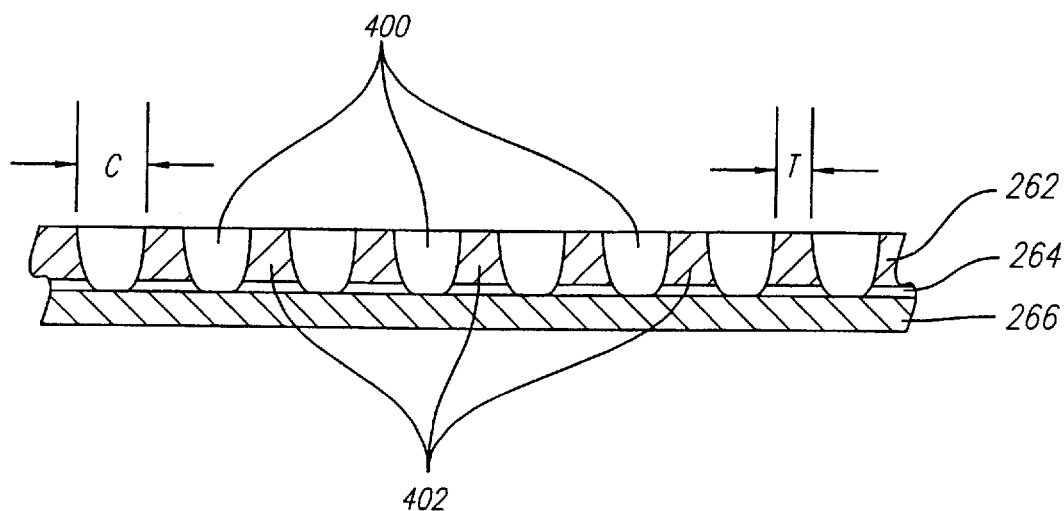
FIG. 32 is a cross-sectional view of micro-perf cutting on the pressure sensitive adhesive web.

Another alternative application of the present invention is micro-perfing on the PSA web 260, to cutting variety of configurations, such as the configurations of FIG. 18. As illustrated by way of example in FIG. 32, a series of cuts 400 and ties 402 are made similar to the micro-perf cutting in FIG. 25, but in this application the cuts 400 only cuts through the printing layer 262 and adhesive layer 264, but not the backing layer 266. This application for example may be used to cut a plurality of stamps having different shapes and sizes. In order to cut the perimeter of the stamps, the control device 55 controls the power level of the laser to pulsate on and off. During the cuts 400, the control device 55 controls the power level of the laser to cut through the face stock layer 262 and the adhesive layer 264, but not the backing layer 266. However, during the ties 402, the power of the laser is turned off. Accordingly, a series of cuts 400 and ties 402 may be cut around the perimeter of stamps having variety of shapes and sizes. The pulsating period may also be varied to control the widths of the cuts "c" and ties "t".

Figure 33:
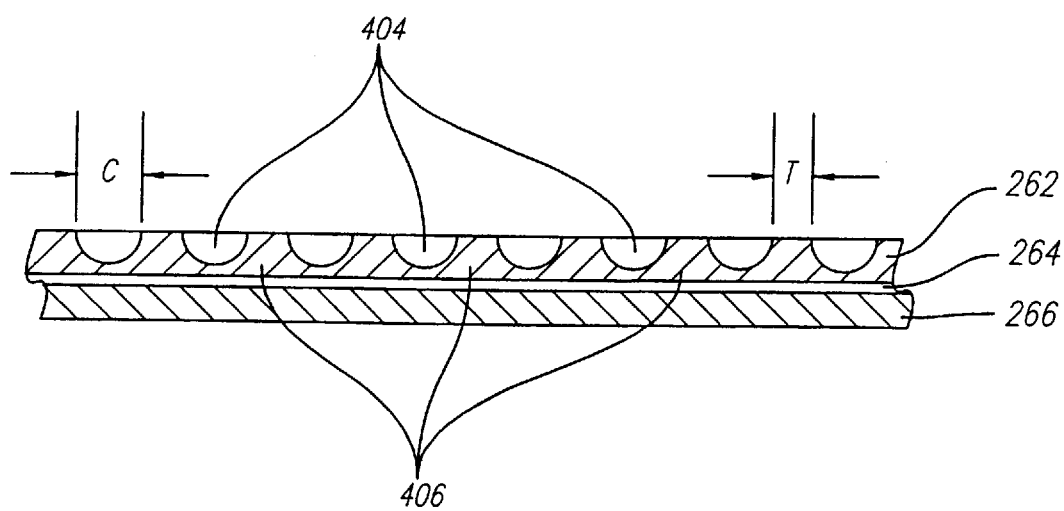
FIG. 33 is a cross-sectional view of another exemplary micro-perf cutting on the pressure sensitive adhesive web.

As shown by way of example in FIG. 33, another micro-perf cutting application has a series of a cuts 404 and ties 406, except in this application, the cuts 404 only cuts partially through the printing layer 262.

Alternatively, the linerless web may be used to cut a plurality of stamps having different shapes and sizes by the micro-perf cutting as mentioned above.

Figure 34A:
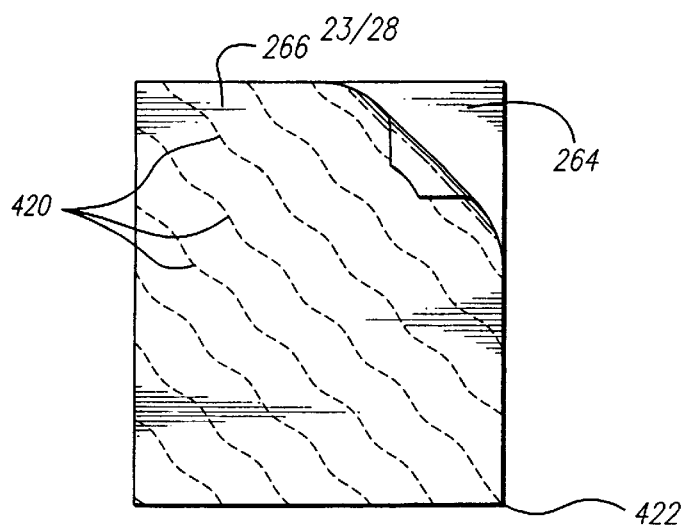
FIG. 34A is a bottom view of a pressure sensitive adhesive with micro-perf sinusoidal cuts on the backing layer.
Figure 34B:
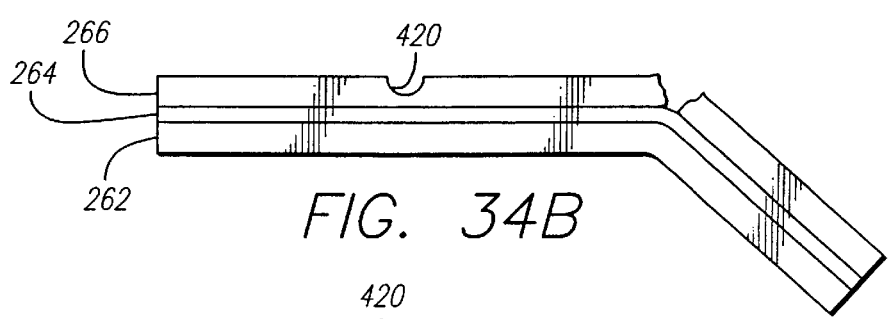
FIG. 34B is a cross-sectional view of the pressure sensitive label sheet being bent.
Figure 34C:
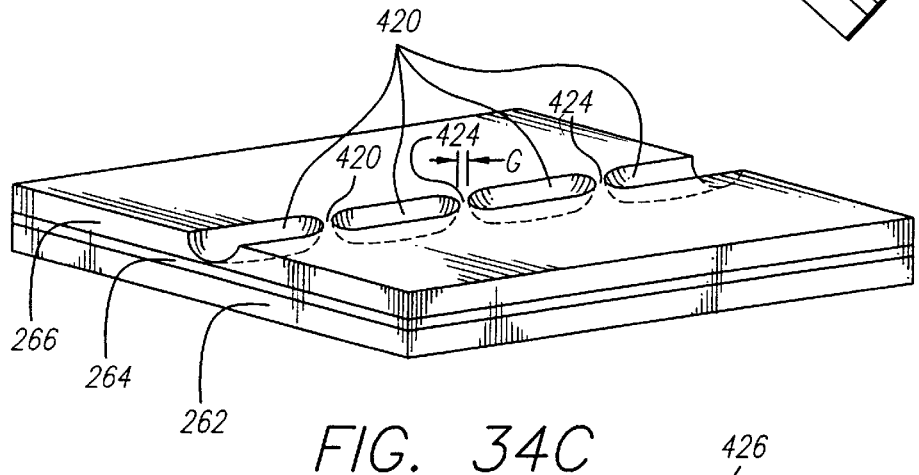
FIG. 34C is an enlarged view of micro-perf cutting on the pressure sensitive adhesive of FIG. 35A.

As illustrated by way of example in FIGS. 34A–34C, another application of the present invention is to make sinusoidal perf cuts on the backing layer 266. In this regard, two U.S. Pat. Nos. 4,549,063 and No. 4,537,809 both to Ang et al., describes an improvement to the art of providing "crack-and-peel" label constructions. It resides in providing a non-linear, discontinuous score (perfing), providing two unique features: (1) the ability to achieve clean edge-to-edge "crack" at any score line by sufficient bending of the multilayer web sheet; and (2) the ability to "peel" from the crack because of the use of a non-linear, discontinuous score line on the backing layer, i.e. non-linear perf cutting.

As shown in FIG. 34B, In order to have the desired effect of "crack-and-peel" so that the backing layer divides cleanly into two pieces, each of which can be peeled off separately, the cutting of the non-linear and discontinuous score needs to be precise. For example, as shown in FIG. 34C, preferable depth of sinusoidal cuts 420 is at least 90% of the backing layer without extending into the face stock layer 262. Additionally, ties 424 must be critically controlled, because ties having a width of little as 0.01 inch (0.0254 cm) may be too long and not crack under the stress of bending. Also, controlling the period and amplitude of the sinusoidal cuts 420, such as the one shown in FIG. 34A, is important, because as the multilayer sheet is bent away from the backing layer side, the peaks of the cuts tends to rise up, offering conveniently-graspable tabs for peeling the backing layer. Furthermore, preferably at least one sinusoidal cut 420 is cut along a corner 422 for ease of peeling the backing layer 266 from one of the corners.

With the present invention the precise cutting requirement of the above is achieved. The control device 55 using the registration marks as the reference point can keep track of the relative position of the moving web 260, thereby initiating the cutting of the sinusoidal perf cutting along the corner 422, so that the backing layer 266 may be easily peeled off. Also, the control device 55 keeping track of the speed of the moving web 260 and any disturbances in the web can precisely control the power level of the laser to cut according to the above cutting requirements. Furthermore, by controlling the power level of the laser based on the speed of the moving web 260, the precise cutting requirements are met even during the initial start up and shut down. Thus, improving the productivity by minimize the scrap and set up times, which may be associated with such laser cutting.

Figure 35:
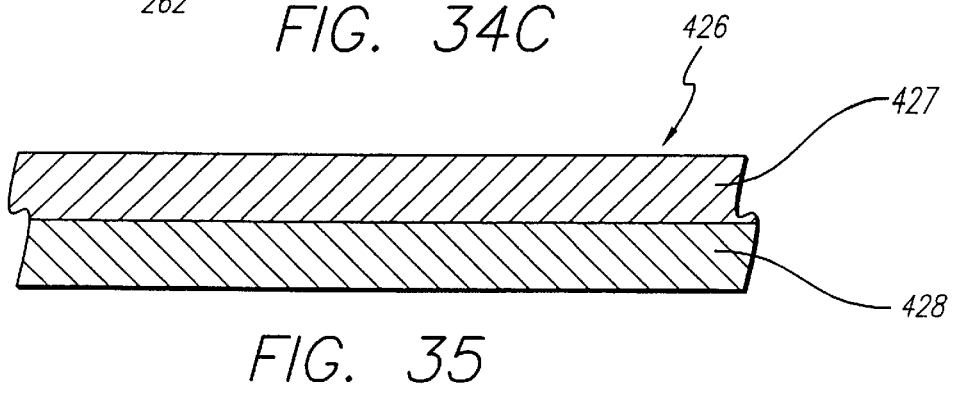
FIG. 35 is a cross-sectional view of a two layer laminate.

As shown by way of example in FIG. 35, another type of a web which may be used with the present invention is a peelable paper web 426, such as the one described in U.S. Pat. No. 4,863,772, to Cross. In brief, this invention relates to a non-adhesive or "dry" labels, they are dry on both sides when facestock constructions are removed from the liner construction. These labels may be used for business cards, rotary cards, tags, coupons, identification cards and the like.

As shown in FIG. 35, the peelable paper web 426 mainly comprise of two elements: (1) a paper web 427, and (2) a thermoplastic film 428 extruded or cast thereon. It is important that until the labels are cut and removed, the two elements of such carry-release components remain firmly anchored to each other during the processing steps, such as die-cutting and impact printing. The die-cutting on the peelable web 426, however, can cause the two elements to lose its firm hold due to the force of the die bearing on the paper web 427. On the other hand, with the present invention, laser is used to cut the web, without the stress on the paper web 427, thereby not disturbing the firm hold between the paper web 427 and the thermoplastic film 428.

As with other webs discussed above, the peelable paper web 426 may be used to cut variety of configurations having different shapes or sizes. Additionally, the present invention may be cut via scoring and perfing.

As illustrated by way of example in FIGS. 36A–36G, yet another type of a web which may be cut by the present invention is a multilayer laminate 430, such as the multilayer laminates disclosed in U.S. Pat. No. 4,925,714 and U.S. Pat. No. 4,837,088 both to Freedman. For example, in FIG. 36A, the multilayer laminate 430 has a four polymeric films 436, 438, 440, and 442, which have been coextruded in contact with each other to provide a multi-ply coextrusion 444. These films are joined at their common interfaces but they are separable at those interfaces; and after they are separated, the interfaces are dry and tack-free. This may be accomplished for example by using films of different compositions for each adjacent pair of films. The multi-ply is then combined with a pressure sensitive adhesive 434 and a liner 432 to form the multilayer laminate 430.

The construction shown in FIG. 36A, may be cut into a series of individual labels or pieces, and applied to substrates where "renewability" is desired, by simply removing the liner 432 and pressing the adhesive side of the construction against a substrate 452, as shown in FIG. 36C. FIG. 36B, shows a cut 446 defining the configuration of the label, a cut 450 which extends only through the film 442 to permit the film 442 to be peeled, and a cut 448 which extends through the films 442 and 440 but not 438 to permit the film 440 to be peeled. As shown in FIG. 36D, to renew the surface the user simply peels off the top film 442. Similarly, as shown in FIG. 36E, when the surface needs to be renewed again, the film 440 is peeled off. Alternatively, FIGS. 36F and 36G, shows successive cuts made on the multi-ply 444, in a series of descending steps, to permit a layer of the film to be peeled at a time.

With the traditional die-cutting methods, the precision necessary to cut one layer of film without cutting the adjacent film is difficult and time consuming. Dies must be precisely calibrated and retooled often to maintain the tight tolerance. For example, if the cut 450 cuts into the film 440, then the film 440 may be peeled along with the film 442. On the other hand, if the cut 450 does not cut through the film 442 then the film 442 may not cleanly peel off. Even with the prior laser systems, delivering precise amount of energy to make the cuts 448 and 450 may be difficult when the multi-ply 444 is moving, due to varying speeds and disturbances. The present invention, however, can deliver precise amount of energy to control the depth of cutting depending on the speed of the moving web 430. Also, by using the registration marks as a reference point, the laser can cut along the precise relative location of the moving web 430. Consequently, even during the initial start up when the speed of the web 430 is accelerating or during the shut down when it is decelerating, the present invention delivers precise amount of energy to control the depth of cutting on the multi-ply 444.

Another type of a web or feed stock which may be cut by the present invention is a multilayer coextruded web wherein the core layer is a suitable laser-opaque material, such as the multilayer feed stock disclosed in PCT International Publication Number WO 95/34263. The multilayer feed stock disclosed therein has excellent ink-printability, excellent mechanical properties, and excellent laser-markability for a variety of applications, such as labeling for flexible plastic bottles. The multilayer feed stock is laser-markable by incorporating the laser-opaque material in the core of the multilayer feed stock, which absorbs or reflects laser light so as to cause marking of the polymer layer in which the laser-opaque material is contained. The laser marking is accomplished without compromising the surface properties of the feed stock, which controls its ink-printability, nor the gross mechanical properties of the product, which controls the ability of the product to be manipulated properly in modern high speed equipment.

Any type of laser-opaque materials may be used, which has ability to absorb and/or reflect laser light of different wave lengths and energy densities and, as a result, "interact" with a polymer material in which they are contained to cause a visible mark to form. The type of "interaction," e.g., thermal degradation of the polymer, simple chemical reaction, generation of gas bubbles, etc., varies depending on the type and operation of the laser employed as well as the type of polymer material employed, and accordingly there must be a "match" of the laser-opaque material with the polymer employed as well as the type and operation of the laser employed. Accordingly, a variety of marks or symbols may be printed on the successive sheets of the above multilayer feed stock with the present invention, such as numbers, letters, figures, bar codes, and the like.

Figure 38:
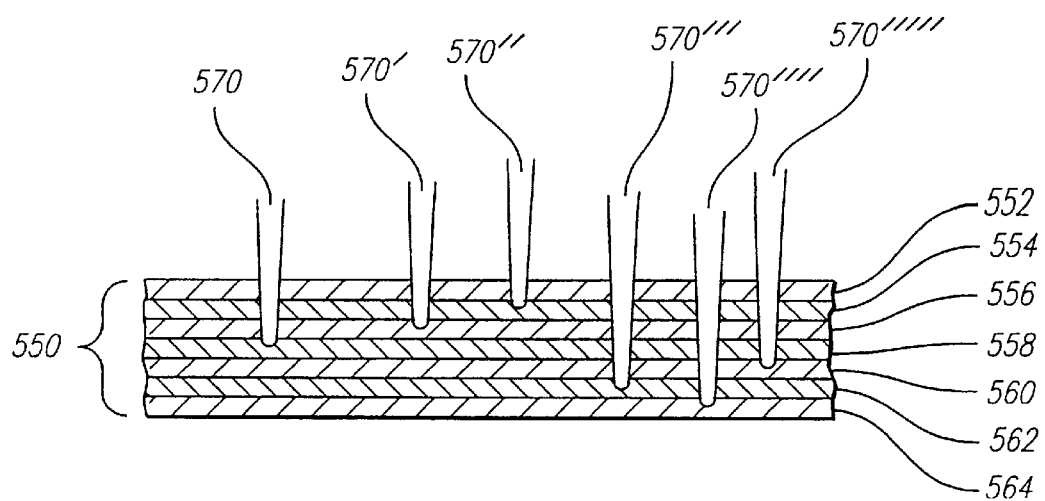

As shown by way of example in FIG. 38, another type of a web or feed stock which may be used with the present invention is a multi-color layer feed stock 550 to cut a variety of configurations with different colors therein. In this embodiment, the feed stock 550 is preferably coextruded with a variety of different color layers, which includes a yellow layer 552, a red layer 554, a purple layer 556, a green layer 558, a black layer 560, an orange layer 562, and a blue layer 564. Here, the laser beam may cut any configurations on the moving feed stock 550, and at the same time display any color in any sequence or any combination thereof. This is accomplished by precisely controlling the energy level of the laser so that the laser cuts through enough layers to reveal the desired color layer. For example, the present invention can cut a green configuration by controlling the energy of the laser to cut through the layers 552, 554, and 556, but not through the green layer 558. Also, the same configuration may be cut revealing any combination of colors by varying the depth of the cuts as the laser cuts the configurations. Accordingly, with the present invention the feed stock 550 may be cut with a variety of configurations with different colors.

Figure 21:
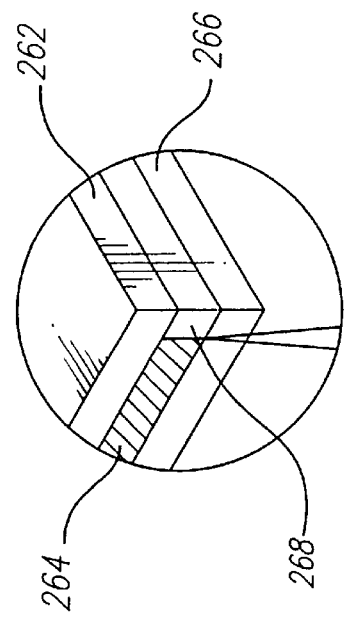
FIG. 21 is an enlarged schematic side view of the encircled area of FIG. 20.
Figure 20:
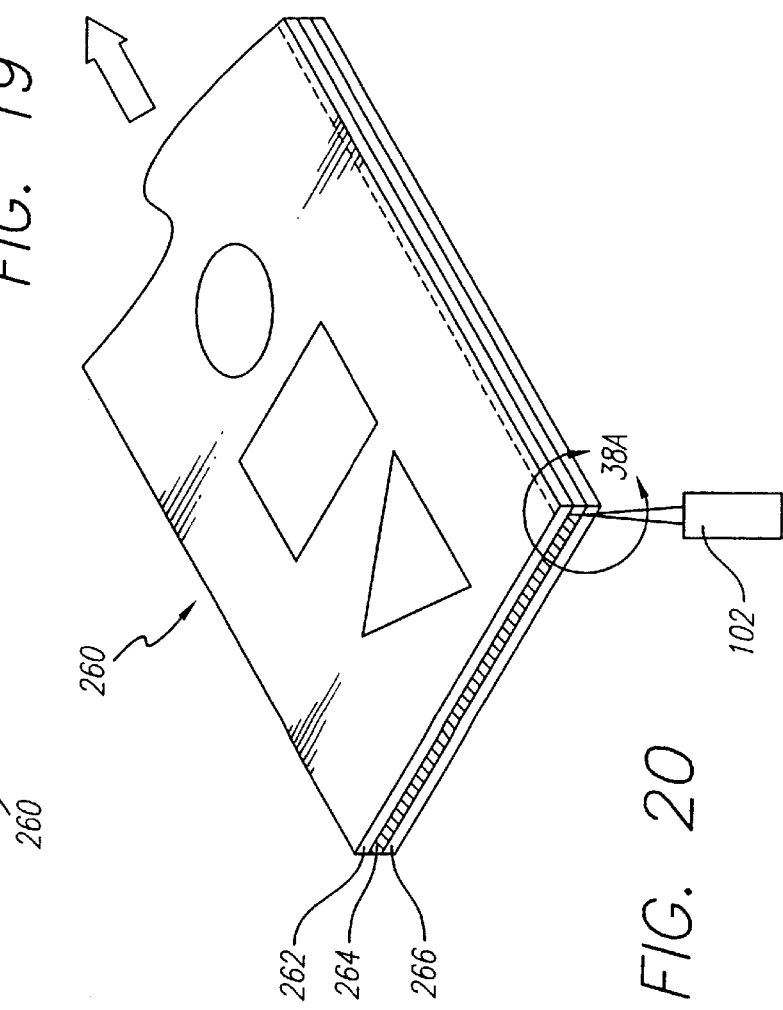
FIG. 20 is a schematic cross-sectional view of a pressure sensitive adhesive web having the adhesive at the edges evaporated by a laser.

As shown by way of example in FIGS. 20 and 21, another application of the present invention is to remove the adhesives from the edges of the PSA web 260. As shown in FIG. 18, once the different configurations of labels are cut on the moving web 260, and they are sheeted, such as the sheets 250 and 252. These sheets may be fed into a laser printer (not shown), for example, to print the desired information or prints on the labels. The printed labels are then peeled off of the liner for their intended use. However, one of the problems with printing with the laser printer is the "oozing" of the adhesives from the edges of the PSA sheets as the PSA sheet passes through the laser printer. The "oozing" is caused by the high temperature within the laser printer which can melt the adhesive, and the pressure applied to the PSA sheets as it passes through the printer tends to squeeze or "ooze" the adhesives out. This can cause number of problems, such as sticky edges on the sheets, and damaging the printer due to the adhesive materials adhering to the moving parts of the printer.

To eliminate the problem of "oozing", FIG. 20 shows, another embodiment of the present invention with the cutting tool 102, which delivers enough laser energy to the edges of the moving web 260 to evaporate the adhesives close to the edge without cutting the printing layer 262 and backing layer 266. By evaporating the adhesives along the edges of the PSA web 260, an adhesive free edge 268 is formed, as shown in FIG. 21, which prevents the adhesives from squeezing out. It should be noted, that the baking layer 266 is uncut although the laser beams passes through it. This is possible because in order for the material to be cut by a laser, the material must absorb the energy of the laser, otherwise the material is uncut. Different materials, however, absorb the energy of the laser at different rate so that the materials having higher absorption rate will be cut faster than the materials having lower absorption rate. Accordingly, if a center layer in a multi-layer web has a higher absorption rate than the outer layers then the laser passing through the multi-layer may cut the center layer without cutting the outer layers. In other words, the center layer because of its higher absorption rate is able to absorb the energy of the laser to vaporize the center material at the point of contact by the laser. On the other hand, the outer layers, which may be transparent, because of their lower absorption rate are not able to absorb enough energy to evaporate the materials at the point of contact by the laser. In this case, the $CO_2$ laser beams may be used in conjunction with the transparent backing layer, facing the beam, for example, which has low absorption rate of the $CO_2$ laser.

Figure 37A:
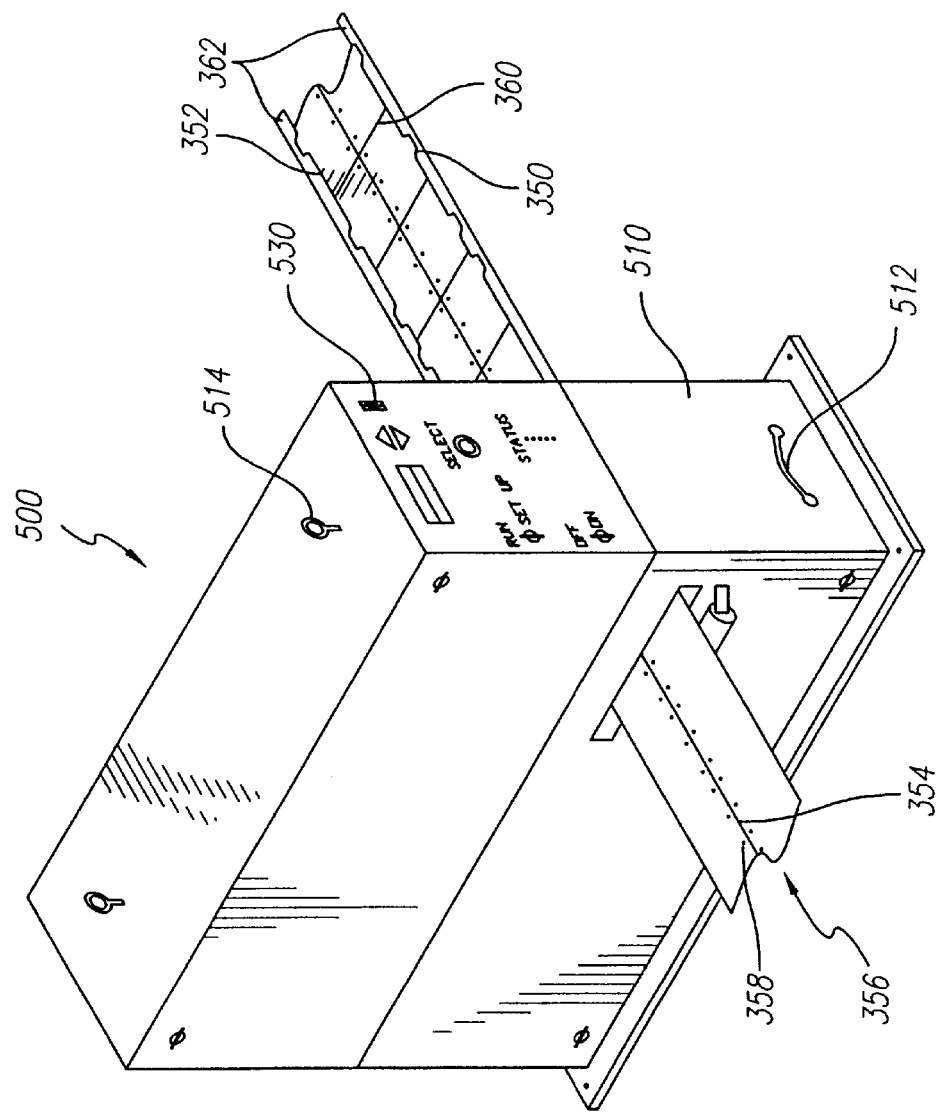
FIG. 37A is a schematic view of a housing enclosing an exemplary laser cutting apparatus.
Figure 37B:
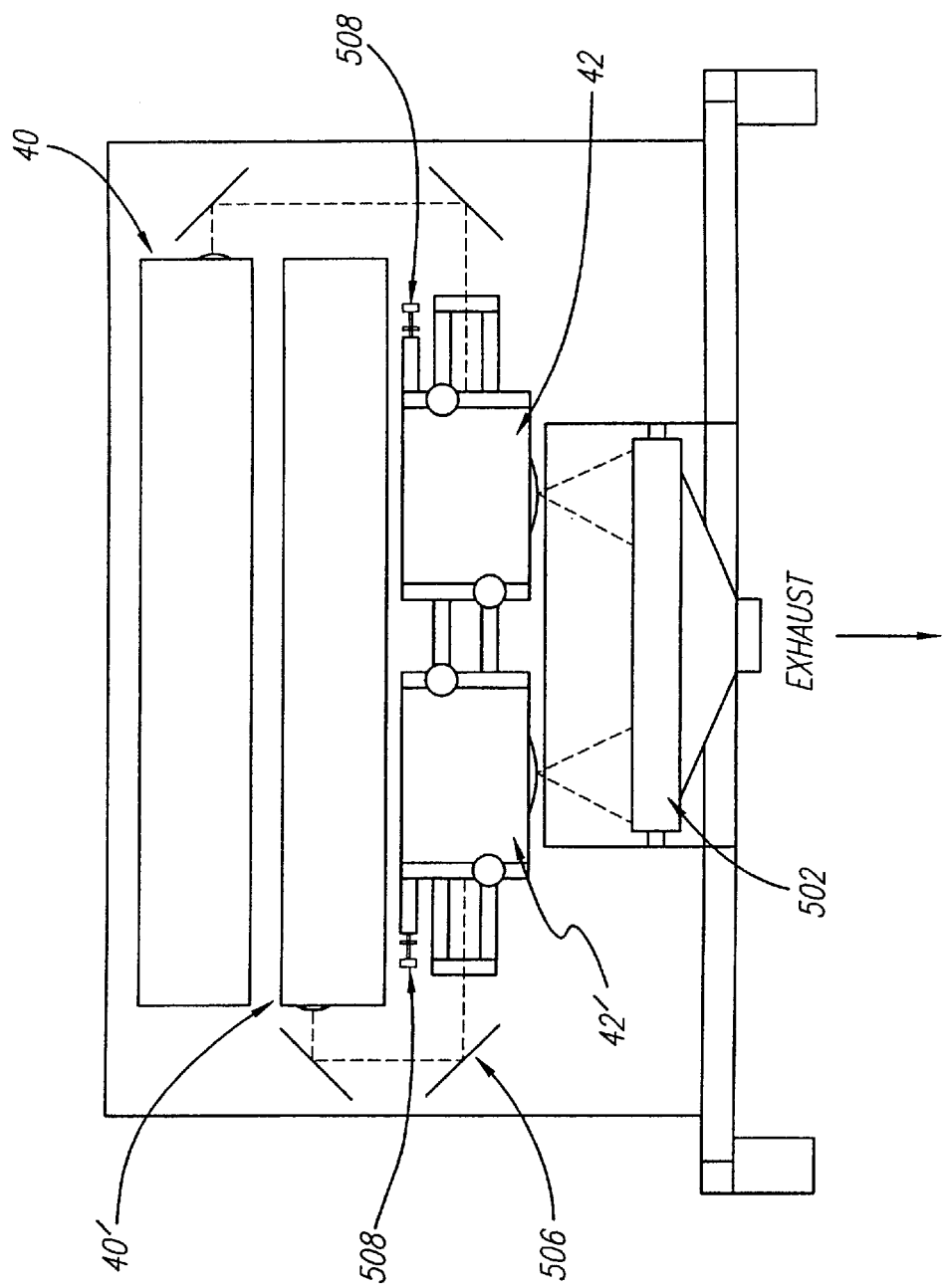
FIG. 37B is a front view of the housing of FIG. 37A.
Figure 37C:
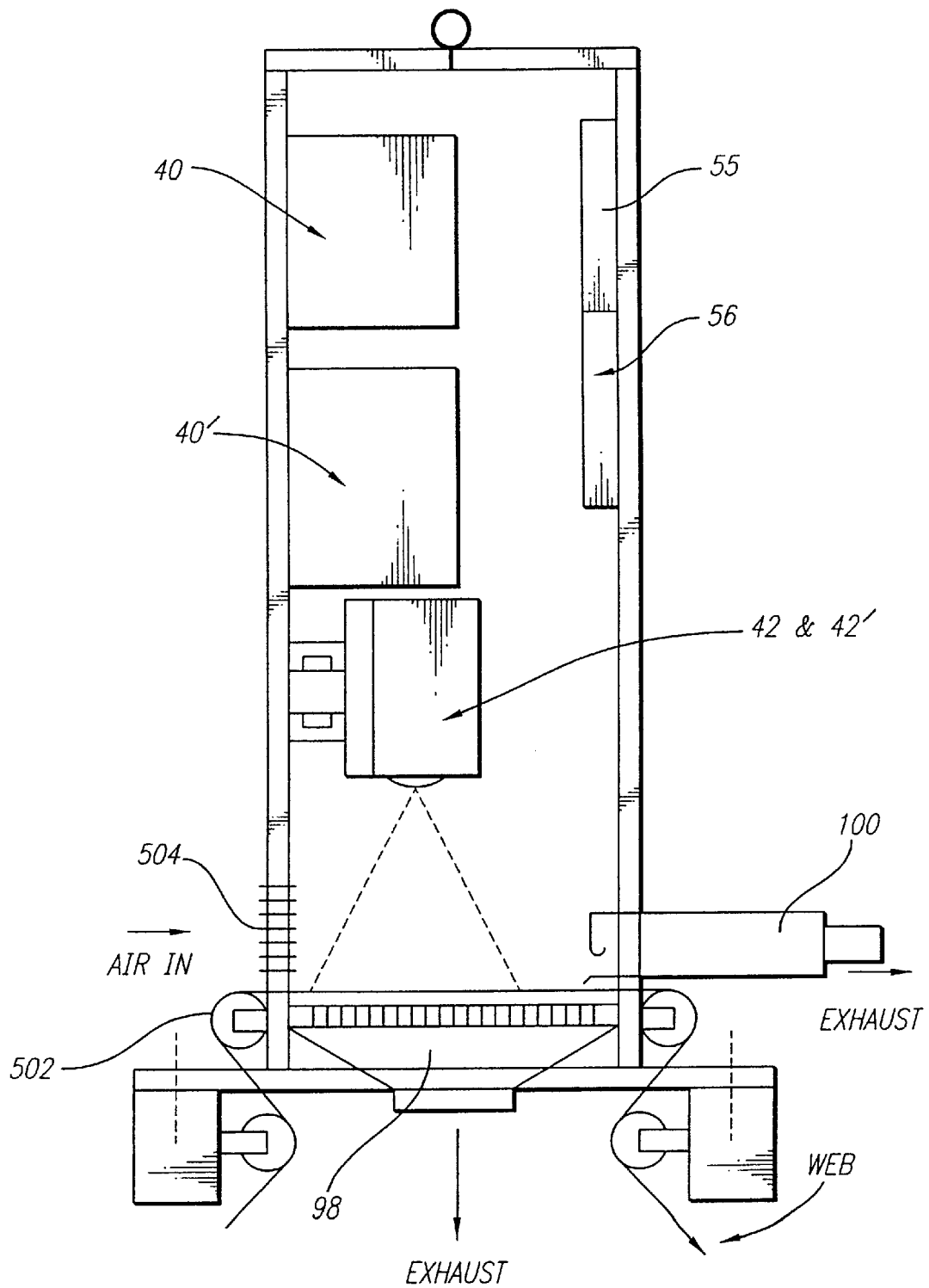
FIG. 37C is a side view of the housing of FIG. 37A.

Attention will now be given to the packaging of the control assembly 18 and laser cutting assembly 14, to provide a convenient commercial product that interfaces with a commercial press, as shown by way of example in FIGS. 37A–37D. FIG. 37A, shows an exemplary housing 500, which interfaces with a commercial press for laser cutting on the moving web 356. This embodiment is performing similar laser cutting operation as discussed above in FIG. 31, which is cutting the successive index tab edges 350 and 352 on both sides of the moving web 356. In the present case, however, the holes 358 and slitting along the centerline 354 have been precut. As shown in FIG. 37C, the housing 500 preferably includes the control device 55, memory 56, two scanners 42 and 42', and two laser guns 40 and 40'. Preferably, the scanners 42 and 42' are mounted over an idle roller 502. A filter inlet 504 is provided along with the side exhaust vent 100 and lower exhaust vent 98 all coupled adjacent to the idle roller 502 for removing vapors in the laser cutting area. FIG. 37B, also shows a plurality of mirrors 506 for directing the laser from the laser guns 40 and 40' to the scanners 42 and 42', respectively. Furthermore, a pair of focus knobs 508 are preferably provided for focusing the laser beams from the scanners 42 and 42'.

FIG. 37A, shows a side panel 510, which is removable to permit an operator to open the side panel 510 and set up a web along the "S" shaped ideal roller 502. A handle 512 is coupled to the side panel 510 to aid in opening the side panel 510. Preferably, the side panel 510 is made of transparent material to permit the operators to inspect the housing 500. Additionally, anchors 514 are coupled to the housing 500, to allow the housing 500 to be hosted into position.

Figure 37D:
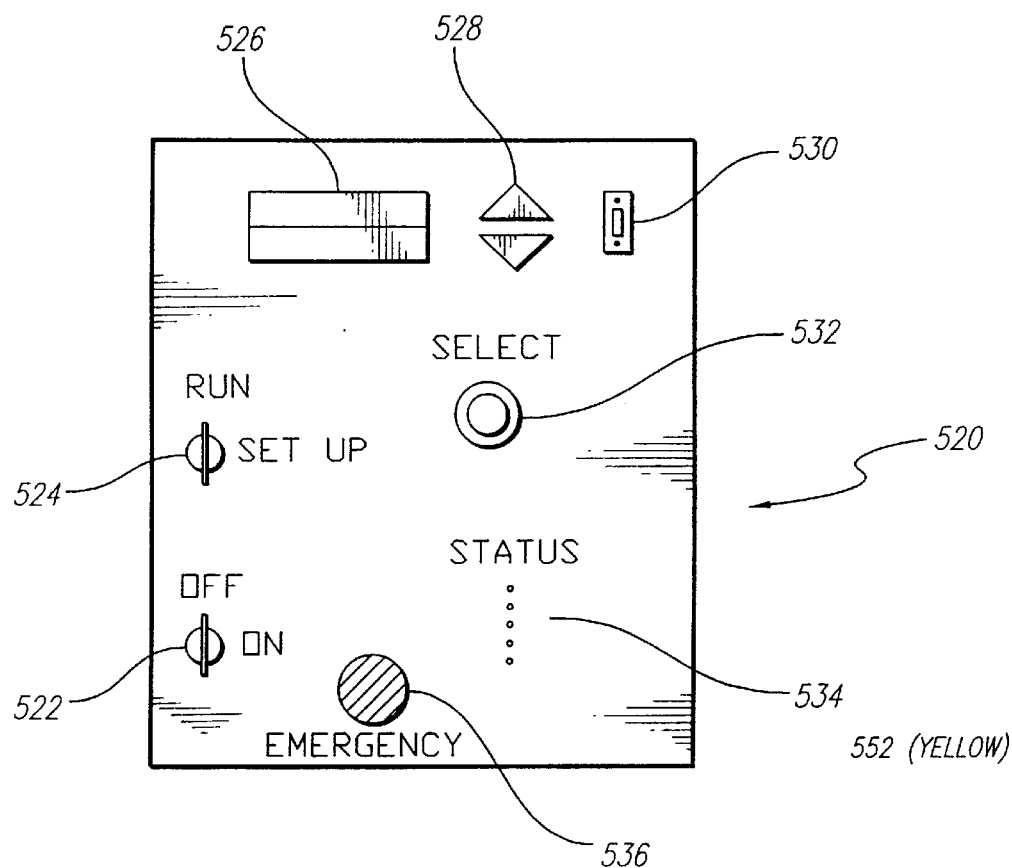
FIG. 37D is a front view of a control panel of the housing of FIG. 37A.

FIG. 37D, shows an exemplary control panel 520 for controlling the laser cutting operation. The exemplary control panel 520 preferably includes:

(a) A keyed on or off switch 522 for turning on or off the laser cutting operation.

(b) A keyed setup or run switch 524 for setting up the laser cutting apparatus or running the apparatus as previously set.

(c) A alpha numeric display panel to view the status of the laser cutting apparatus.

(d) An up and down scroll buttons 528 for selecting the desired inputs from the menu.

(e) A serial connector 530 for downloading the configurations to the memory device.

(f) A select button 532 to choose the parameters to be change.

(g) A status lights 534 to indicate which cutting operation is running.

(h) An emergency button 536 to shut off the cutting operation in case of an emergency.

In order to start the cutting operation, an operator with a key would first turn the on and off switch 522 on. The operator may then continue to run the cutting operation as previously set, or set up a new operation by turning the key switch 524 to setup. Thereafter, the operator may scroll the menu of options by pressing the selection button 532, where the menu of options are displayed on the alpha numeric display 526. Once the operator has reached the option that is to be changed, the operator may increase or decrease the parameter by pressing the up or down buttons 528. For example, if the operator wants to change the power level of the laser, then the operator would press the selection button until the laser power level parameter is reached, at that point, the operator would press either of the up or down button 528 to increase or decrease the power level of the laser, respectively.

With respect to materials, the present invention may be employed to cut a feed stock having compositions such as: paper, vinyl, polyvinyl chloride films, polyester films, polyolefin films, non-woven fabrics, etc. Included among the types of paper which can be used is paper, clay coated paper, glassine, polymer coated paper, paper-board from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkalichlorine processes, nitric acid processes, semi-chemical processes, etc. The paper can also be opaque, or translucent.

The present invention may also has various other capabilities, such as: engraving, cutting linerless labels at the point of application, cutting stamps with the linerless web, authenticity markings for security labels, directly or through a transparent film. In regards to the laser beam, the $CO_2$ laser is preferred for the cutting and some marking applications, however, the description of the $CO_2$ laser in this application is not to be taken in a limiting sense. In other words, other laser beams operating at different wave lengths may be used for cutting and marking, depending on the application.

The present invention offers number of advantages by improving productivity, reducing down time and labor cost, flexibility of changing cutting requirements, consistency of cutting quality, no need for expensive dies, and eliminating the need for collating. Additionally, the present invention has various features to further enhance the quality of the final commercial products. For example, the scanner 42 may include either (1) a bifocal lens or (2) a single focus lens with the focal point at the midpoint of the web, in order to bevel the edges of the moving web as it cuts. At the same time, the laser cutting tool 102 may be used to provide a smooth and more accurate dimensional cut along the opposite edge of the index tab edge sheets. And to make the present invention work more efficiently, a ventilation system is preferably used to contain and remove the vapors or dusts that are created by the laser cutting on the moving web. Alternatively, the feed stock may be a plurality of sheets fed from a feeder; and the leading edges of the sheets may be used as the registration marks or wherein the sheets are successively stopped for laser cutting and/or marking and are then moved on to a collection station.

In conclusion, it is to be understood that the foregoing detailed description and the accompanying drawings relate to the presently preferred illustrative embodiment of the invention. However, various changes may be made without departing from the spirit and scope of the invention. Thus, the disclosed examples are used to illustrate the spirit and scope of the invention and are not to be considered limitations relative to the present invention. Additionally, the dimensions of the drawings are for illustrative purposes only and they may not be proportional or exact.

What is claimed is:

1. A laser cutting apparatus for cutting sets of different location index tab edges from a high speed moving web, comprising:

a driver for moving a web, said web having periodic registration marks, wherein said registration mark indicates the beginning of successive index tab sheets;

a control device for controlling said laser cutting apparatus;

a laser device for providing a laser beam;

a scanner coupled to said laser device, said scanner directing said laser beam to cut successive index tab sheets;

an interpreter circuit for translating signals between said control device and said scanner;

an encoder for monitoring the speed of said press that is indicative of said web speed;

a registration sensor coupled to said press, said registration sensor detecting said registration marks;

a frame for interfacing said laser cutting apparatus with said driver for moving said web;

said control device communicating with said interpreter, encoder, and registration sensor, said control device generating a synthesize signal from said registration signal and said web speed signal to compensate for the disturbances and/or stretching of said moving web, said synthesized signal sent through said interpreter to direct said scanner to cut sets of successive index tab edges with differently spaced tabs;

an input and output air ventilation system for removing vapors or dust formed from said laser cutting on said moving web; and means for directing said laser beam toward said web to form beveled edges on the laser cut sheets;

whereby sets of sheets with different location index tabs at the output are formed of said apparatus without the need for collating the sheets.

2. An apparatus as defined in claim 1, wherein said scanner has a flat field lens for further focusing said laser beam, said flat field lens focusing said laser beam to a focal point for cutting said web, said focal point maintaining contact along said web as directed to move horizontally.

3. An apparatus as defined in claim 1, wherein said control device outputs signals to said scanner to cut successive index tab edges along the edge of said moving web.

4. An apparatus as defined in claim 1, wherein said laser cutting apparatus further includes a second laser device and scanner for sheeting said moving web, wherein said index tab sheets are collated as they are cut by said second scanner.

5. An apparatus as defined in claim 1, wherein said laser cutting apparatus further includes a mechanical sheeter for sheeting said moving web, wherein said index tab sheets are collated as they are cut by said mechanical sheeter.

6. An apparatus as defined in claim 1, wherein said input and output ventilation system includes:

an air filter and pump for supplying clean air to a dehumidifier to dry said clean air;

at least one conduit for delivering said clean and dry air to at least one air knife;

at least one vent for removing said vapor and/or dust;

wherein, said at least one air knife directs said clean and dry air to the cutting area of said laser beam and said at least one vent removes said vapors or dust.

7. A laser cutting apparatus for cutting sets of different location index tab sheets from a moving web, comprising:

a web feeding apparatus for feeding a web along a predetermined path;

a laser device for providing a laser beam;

a scanner coupled to said laser device for directing said laser beam at said moving web as it moves along its path; and a control apparatus coupled to said scanner for controlling said scanner to direct said laser to cut successively tabs on successive sections of said moving web, with said tabs on successive sheets being in different locations;

whereby sets of sheets with different location index tabs at the output are formed of said apparatus without the need for collating the sheets.

8. An apparatus as defined in claim 7, wherein said laser beam cuts successive index tab edges along the edge of said moving web, wherein a continuous strip along the edge of said moving web is formed and removed through a vacuum outlet.

9. An apparatus as defined in claim 8, wherein said continuous strip has a periodic registration marks, wherein each of said registration marks indicates the next successive sheet to be cut.

10. An apparatus as defined in claim 7, wherein said control apparatus directs said scanner to cut successive index tab edges perpendicular to the edge of said moving web.

11. An apparatus as defined in claim 7, wherein said laser cutting apparatus further includes a second laser device and scanner coupled to said control apparatus for cutting successive index tab edges along both edges of said moving web.

12. An apparatus as defined in claim 7, wherein said control apparatus is programmable to cut different configurations of tabs.

13. A laser cutting apparatus for cutting sets of differently laser cut sheets from a feed stock, comprising:

a feeder apparatus for feeding a feed stock along a predetermined path to place successive feed stock sheet areas in a laser cutting zone, wherein said feed stock has a periodic registration marks to cut the next successive sections of said feed stock;

a laser device for providing a laser beam;

a scanner coupled to said laser device for directing said laser beam at said feed stock when it is within the laser cutting zone; and a control apparatus coupled to said scanner for controlling said scanner to direct said laser beam to cut successive configurations on successive sections of said feed stock, with said configurations on successive sheets being in different patterns;

a registration sensor coupled to said control apparatus, said registration sensor detects said registration marks to use as a reference point, wherein said control apparatus controls said scanner to direct the laser beam based on the reference point to cut the next successive sections of the feed stock;

whereby sets of sheets with different configurations of pattern sheets are formed at the output of said apparatus without the need for collating the sheets.

14. An apparatus as defined in claim 13, wherein said control device is linked to a memory device for storing said different configurations.

15. An apparatus as defined in claim 13, wherein said control apparatus is coupled to an encoder for monitoring the speed of said moving feed stock.

16. An apparatus as defined in claim 13, wherein said feed stock has a periodic registration marks, wherein each of said registration mark indicates the next successive sheet to be cut.

17. An apparatus as defined in claim 13, wherein said scanner includes a bifocal lens for splitting said laser beam to a pair of laser beams having focal points directed respectively slightly above and slightly below said feed stock, whereby said first focal point bevels the top edge and said second focal point bevels the bottom edge of said feed stock, resulting in substantially rounded edge cuts.

18. An apparatus as defined in claim 13, wherein said feeder apparatus is a commercial web press.

19. An apparatus as defined in claim 13, wherein said feed stock is a continuous web stock.

20. An apparatus as defined in claim 13, wherein said feed stock is a sheeted stock.

21. An apparatus as defined in claim 13, wherein said feed stock is comprised of a multilayers of material.

22. An apparatus as defined in claim 21, wherein said control apparatus controls the power level of said laser beam to cut selectively at least one of said multilayers.

23. An apparatus as defined in claim 13, wherein said control apparatus adjusts the power level of said laser beam to control the depth of cutting on said feed stock.

24. An apparatus as defined in claim 21, wherein said multilayers of material includes a printing layer or face stock, a release coated backing layer, and an intermediate adhesive layer adhering said printing layer and backing layer together.

25. An apparatus as defined in claim 21, wherein said multilayer has at least one core layer of laser-opaque material.

26. An apparatus as defined in claim 21, wherein said multilayer is comprised of a variety of color layers.

27. An apparatus as defined in claim 24, wherein said backing layer has a series of curved perf cuts for crack and peel of said backing layer.

28. An apparatus as defined in claim 13, wherein said control apparatus controls the power level of said laser for partial cutting of said feed stock.

29. An apparatus as defined in claim 15, wherein said control apparatus adjusts for disturbances in said moving feed stock based on said feed stock speed including acceleration and deceleration to cut uniformly, thereby minimizing scrap.

30. An apparatus as defined in claim 17, wherein said control apparatus monitors the relative location of said moving feed stock based on said registration marks and said feed stock speed, wherein said control apparatus controls said scanner to direct said laser beam to cut successive configurations on the pre-determined relative location of said moving feed stock.

31. An apparatus as defined in claim 13, wherein said scanner directs said laser to cut successively tabs on successive sections of said feed stock, with said tabs on successive sheets being in different locations.

32. An apparatus as defined in claim 13, wherein said control apparatus is coupled to an interpreter circuit for translating signals between said control apparatus and said scanner.

33. An apparatus as defined in claim 13, wherein said scanner has a flat field lens for further focusing said laser beam to a focal point, said flat field lens maintaining said focal point along the flat field area.

34. An apparatus as defined in claim 13, wherein said laser cutting apparatus further includes a second laser device and scanner for sheeting said feed stock, wherein said sheets are collated as they are cut by said second scanner.

35. An apparatus as defined in claim 13, wherein said laser cutting apparatus further includes a mechanical sheeter for sheeting said feed stock, wherein said sheets are collated as they are cut by said mechanical sheeter.

36. An apparatus as defined in claim 13, wherein said laser cutting apparatus further includes a second laser device and scanner for cutting at least one hole.

37. An apparatus as defined in claim 13, wherein said laser cutting apparatus further includes a laser cutting tool for slitting said feed stock.

38. An apparatus as defined in claim 16, wherein said laser cutting apparatus includes a rolling pin for printing said registration marks on said feed stock to define said sheet dimensions.

39. An apparatus as defined in claim 13, wherein said laser cutting apparatus includes a printer for printing onto said feed stock.

40. An apparatus as defined in claim 13, wherein said laser cutting apparatus includes an applicator for applying a protective film onto said feed stock.

41. An apparatus as defined in claim 40, wherein said protective film is a pressure sensitive adhesive.

42. An apparatus as defined in claim 40, wherein said protective film is a linerless adhesive.

43. An apparatus as defined in claim 40, wherein said laser cutting apparatus includes a laser cutter for cutting said protective film from said applicator.

44. An apparatus as defined in claim 40, wherein said laser cutting apparatus includes a folding apparatus for wrapping said protective film over other side of said feed stock.

45. An apparatus as defined in claim 40, wherein said laser cutting apparatus includes a heater for bonding said protective film to said feed stock.

46. An apparatus as defined in claim 13, wherein said laser cutting apparatus is enclosed in a housing.

47. An apparatus as defined in claim 46, wherein said housing has a control panel to control the operation of said laser cutting apparatus.

48. An apparatus as defined in claim 13, wherein said control apparatus controls the pulse period of said laser for partial cutting to vary the widths of cuts and ties.

49. A laser cutting apparatus for cutting sets of differently laser cut sheets from a feed stock, comprising:
 a feeder apparatus for feeding a feed stock along a predetermined path to place successive feed stock sheet areas in a laser cutting zone;
 a laser device for providing a laser beam;
 a scanner coupled to said laser device for directing said laser beam at said feed stock when it is within the laser cutting zone; and
 a control apparatus coupled to said scanner for controlling said scanner to direct said laser beam to cut successive configurations on successive sections of said feed stock, wherein said scanner directs said laser to cut successively tabs on successive sections of said feed stock, with said tabs on successive sheets being in different locations.

50. A system for accurately cutting on a moving feed stock, comprising:
 a feed stock having periodic registration marks, wherein each of the registration marks indicates next successive sections of the feed stock to be cut;
 a laser cutting apparatus adapted to direct a laser beam at the feed stock as the feed stock passes through a laser cutting zone, wherein the laser cutting apparatus detects each of the registration marks as a reference point to direct the laser beam to cut on next successive sections of the feed stock;
 a laser device for providing a laser beam;
 a scanner coupled to the laser device for directing the laser beam at the feed stock when it is within the laser cutting zone; and
 a control apparatus coupled to the scanner for controlling the scanner to direct the laser beam to cut successive configurations on successive sections of the feed stock, with the configurations on successive sheets being in different patterns.

51. A system according to claim 50, including a feeder apparatus for feeding the feed stock along a predetermined path to place successive feed stock sheet areas in the laser cutting zone.

52. A system according to claim 50, wherein the laser cutting apparatus includes a registration sensor to detect the registration marks.

53. A system according to claim 50, wherein the feed stock is a continuous web stock.

54. A system according to claim 50, wherein the feed stock is a sheeted stock.

55. A system according to claim 50, wherein said laser cutting apparatus directs the laser to cut successively tabs on successive sections of the feed stock, with the tabs on successive sheets being in different locations.

56. A laser cutting apparatus for cutting sets of differently laser cut sheets from a feed stock, comprising:

- a feeder apparatus for feeding a feed stock along a predetermined path to place successive feed stock sheet areas in a laser cutting zone;
- a laser device for providing a laser beam;
- a scanner coupled to said laser device for directing said laser beam at said feed stock when it is within the laser cutting zone;
- a control apparatus coupled to said scanner for controlling said scanner to direct said laser beam to cut successive configurations on successive sections of said feed stock, with said configurations on successive sheets being in different patterns; and
- wherein said laser cutting apparatus includes an applicator for applying a protective film onto said feed stock;
- whereby sets of sheets with different configurations of pattern sheets are formed at the output of said apparatus without the need for collating the sheets.

57. An apparatus as defined in claim 56, wherein said protective film is a pressure sensitive adhesive.

58. An apparatus as defined in claim 56, wherein said protective film is a linerless adhesive.

59. An apparatus as defined in claim 56, wherein said laser cutting apparatus includes a laser cutter for cutting said protective film from said applicator.

60. An apparatus as defined in claim 56, wherein said laser cutting apparatus includes a folding apparatus for wrapping said protective film over other side of said feed stock.

61. An apparatus as defined in claim 56, wherein said laser cutting apparatus includes a heater for bonding said protective film to said feed stock.

62. A laser cutting apparatus for cutting sets of differently laser cut sheets from a feed stock, comprising:

- a feeder apparatus for feeding a feed stock along a predetermined path to place successive feed stock sheet areas in a laser cutting zone;
- a laser device for providing a laser beam;
- a scanner coupled to said laser device for directing said laser beam at said feed stock when it is within the laser cutting zone;
- a control apparatus coupled to said scanner for controlling said scanner to direct said laser beam to cut successive configurations on successive sections of said feed stock, with said configurations on successive sheets being in different patterns; and
- wherein said scanner includes a bifocal lens for splitting said laser beam to a pair of laser beams having focal points directed respectively slightly above and slightly below said feed stock, whereby said first focal point bevels the top edge and said second focal point bevels the bottom edge of said feed stock, resulting in substantially rounded edge cuts;
- whereby sets of sheets with different configurations of pattern sheets are formed at the output of said apparatus without the need for collating the sheets.

* * * * *